(12) United States Patent
Miyake et al.

(10) Patent No.: US 8,306,357 B2
(45) Date of Patent: Nov. 6, 2012

(54) IMAGE PROCESSING APPARATUS, IMAGE PROCESSING METHOD, AND COMPUTER PROGRAM

(75) Inventors: Nobutaka Miyake, Kanagawa (JP); Minoru Kusakabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/198,213

(22) Filed: Aug. 4, 2011

(65) Prior Publication Data

US 2011/0311155 A1  Dec. 22, 2011

Related U.S. Application Data

(62) Division of application No. 10/446,723, filed on May 29, 2003, now Pat. No. 8,023,764.

(30) Foreign Application Priority Data

Jun. 5, 2002  (JP) .................................. 2002-164625

(51) Int. Cl.
*G06K 9/40* (2006.01)
(52) U.S. Cl. ....................................... 382/275; 382/261
(58) Field of Classification Search .................. 382/275, 382/260–265, 254, 304, 162, 167, 176, 269, 382/282; 348/606–624, 700, 625; 358/1.9–3.31, 358/447, 461, 463
See application file for complete search history.

(56) References Cited

U.S. PATENT DOCUMENTS

| | | |
|---|---|---|
| 4,783,840 A | 11/1988 | Song |
| 5,068,909 A | 11/1991 | Rutherford et al. |
| 5,111,310 A | 5/1992 | Parker et al. |
| 5,327,246 A | 7/1994 | Suzuki |
| 5,497,154 A * | 3/1996 | Komamura .................... 341/131 |
| 5,563,963 A | 10/1996 | Kaplan et al. |
| 5,732,159 A * | 3/1998 | Jung .............................. 382/262 |
| 5,771,318 A | 6/1998 | Fang et al. |
| 5,818,964 A * | 10/1998 | Itoh .............................. 382/205 |

(Continued)

FOREIGN PATENT DOCUMENTS

EP  0 917 357  5/1999

(Continued)

OTHER PUBLICATIONS

Usevitch et al., "Adaptive Filtering Using Filter Banks," IEEE Transactions N Circuits and Systems-I1 Analog and Digital Signal Processing, vol. 43, No. 3, Mar. 1996.

(Continued)

*Primary Examiner* — Vu Le
*Assistant Examiner* — Andrae S Allison
(74) *Attorney, Agent, or Firm* — Fitzpatrick, Cella, Harper & Scinto

(57) ABSTRACT

An image processing apparatus, an image processing method, and a computer program, visually remove low-frequency noise contained in image data. Image data containing low-frequency noise is input from an input terminal. A window unit designates a window made up of a pixel of interest, and its surrounding pixels. A pixel selector selects a selected pixel to be compared with the pixel of interest from the window, and a pixel value determination unit determines a new pixel value of the pixel of interest on the basis of the pixel values of the selected pixel and pixel of interest. New image data is generated by substituting the pixel value of the pixel of interest by the new pixel value.

9 Claims, 14 Drawing Sheets

U.S. PATENT DOCUMENTS

| | | | |
|---|---|---|---|
| 5,825,509 A * | 10/1998 | Nomura | 382/252 |
| 5,832,136 A * | 11/1998 | Hirose | 382/275 |
| 6,009,213 A | 12/1999 | Miyake | |
| 6,075,902 A | 6/2000 | Kojima | |
| 6,108,455 A | 8/2000 | Mancuso | |
| 6,151,420 A | 11/2000 | Wober et al. | |
| 6,195,467 B1 | 2/2001 | Asimopoulos et al. | |
| 6,438,270 B1 | 8/2002 | Harrington | |
| 6,496,605 B1 | 12/2002 | Osa | |
| 6,532,310 B1 * | 3/2003 | Into | 382/275 |
| 6,621,595 B1 | 9/2003 | Fan et al. | |
| 6,718,068 B1 * | 4/2004 | Gindele et al. | 382/254 |
| 6,721,458 B1 * | 4/2004 | Ancin | 382/261 |
| 6,771,833 B1 | 8/2004 | Edgar | |
| 6,771,835 B2 | 8/2004 | Han et al. | |
| 6,807,300 B1 * | 10/2004 | Gindele et al. | 382/167 |
| 6,882,754 B2 | 4/2005 | Hayashi | |
| 6,907,144 B1 | 6/2005 | Gindele | |
| 6,931,160 B2 | 8/2005 | Gindele et al. | |
| 7,058,199 B1 | 6/2006 | Au et al. | |
| 7,064,868 B2 | 6/2006 | Kawano | |
| 7,103,214 B2 * | 9/2006 | Kusakabe et al. | 382/162 |
| 7,127,121 B1 | 10/2006 | Pan | |
| 7,130,477 B1 | 10/2006 | Schillings | |
| 7,433,538 B2 | 10/2008 | Kusakabe et al. | |
| 7,634,153 B2 | 12/2009 | Miyake et al. | |
| 2001/0033387 A1 | 10/2001 | Nogiwa et al. | |
| 2002/0001416 A1 | 1/2002 | Zhou et al. | |
| 2002/0030797 A1 | 3/2002 | Enomoto | |
| 2002/0076117 A1 | 6/2002 | Allred et al. | |
| 2002/0145610 A1 | 10/2002 | Barilovits et al. | |
| 2003/0063144 A1 | 4/2003 | Kusakabe et al. | |
| 2003/0202696 A1 | 10/2003 | Simard | |
| 2003/0228067 A1 | 12/2003 | Miyake et al. | |
| 2004/0096103 A1 | 5/2004 | Gallagher et al. | |

FOREIGN PATENT DOCUMENTS

| | | |
|---|---|---|
| EP | 1 174 824 | 1/2002 |
| JP | 63-129470 | 6/1988 |
| JP | 04-235472 | 8/1992 |
| JP | 04-239886 | 8/1992 |
| JP | 4-250769 | 9/1992 |
| JP | 07-75103 | 3/1995 |
| JP | 07-203210 | 8/1995 |
| JP | 08-56357 | 2/1996 |
| JP | 09-326930 | 12/1997 |
| JP | 10-98722 | 4/1998 |
| JP | 10-200710 | 7/1998 |
| JP | 2000-022939 | 1/2000 |
| JP | 2001-119575 | 4/2001 |
| JP | 2001-177731 | 6/2001 |
| JP | 2001-186366 | 7/2001 |
| JP | 2001-245179 | 9/2001 |
| JP | 2001-298619 | 10/2001 |
| JP | 2002-10108 | 1/2002 |
| JP | 2002-158839 | 5/2002 |
| KR | 2001-0113666 | 12/2001 |
| WO | 93/21725 | 10/1993 |
| WO | 00/46749 | 8/2000 |
| WO | 01/26053 | 4/2001 |
| WO | 02/05213 | 1/2002 |

OTHER PUBLICATIONS

Yang et al., "Adaptive filter for noise removal using wavelet transform," Proc. SPIE vol. 2501. pp. 187-197, Visual Communications and Image Processing, Apr. 1995.

Liu et al., "Oriented Statistical Nonlinear Smoothing Filter," International Conference on Image Processing, 1998.

Japanese Office Action dated Apr. 14, 2008, in Japanese Application No. 2006-225746.

Baxes, Digital Image Processing, 1994, John Wiley & Sons, Inc., pp. 86-91.

* cited by examiner

IMAGE PROCESSING APPARATUS, IMAGE PROCESSING METHOD, AND COMPUTER PROGRAM

This is a divisional application of application Ser. No. 10/446,723, filed on May 29, 2003, and issued as U.S. Pat. No. 8,023,764 on Sep. 20, 2011.

BACKGROUND OF THE INVENTION

1. Field of the Invention

The present invention relates to an image processing apparatus and image processing method, and a computer program, which can visually remove noise components from image data on which noise components that are not contained in the original signal components are superposed.

2. Background of the Invention

Conventionally, a technique for removing noise components from a digital image on which noise components that are not contained in the original signal components are superposed has been studied. The characteristics of noise to be removed are diverse depending on their generation causes, and noise removal methods suited to those characteristics have been proposed.

For example, when an image input device such as a digital camera, an image scanner, or the like is assumed, noise components are roughly categorized into noise which depends on the input device characteristics of a solid-state image sensing element or the like and input conditions such as an image sensing mode, a scene, or the like, and has already been superposed on a photoelectrically converted analog original signal, and noise which is superposed via various digital signal processes after the analog signal is converted into a digital signal via an A/D converter.

As an example of the former (noise superposed on an analog signal), impulse noise that generates an isolated value to have no correlation with surrounding image signal values, noise resulting from a dark current of the solid-state image sensing element, and the like are known. As an example of the latter (noise superposed during a digital signal process), noise components are amplified simultaneously with signal components when a specific density, color, and the like are emphasized in various correction processes such as gamma correction, gain correction for improving the sensitivity, and the like, thus increasing the noise level.

As an example of deterioration of an image due to noise superposed in a digital signal process, since an encoding process using a JPEG algorithm extracts a plurality of blocks from two-dimensional (2D) image information, and executes orthogonal transformation and quantization for respective blocks, a decoded image suffers block distortion that generates steps at the boundaries of blocks.

In addition to various kinds of noise mentioned above, a cause that especially impairs the image quality is noise (to be referred to as "low-frequency noise" hereinafter) which is generated in a low-frequency range and is conspicuously observed in an image sensed by a digital camera or the like. This low-frequency noise often results from the sensitivity of a CCD or CMOS sensor as a solid-state image sensing element. In an image sensing scene such as a dark scene with a low signal level, a shadowy scene, or the like, low-frequency noise is often emphasized due to gain correction that raises signal components irrespective of a poor S/N ratio.

Furthermore, the element sensitivity of the solid-state image sensing element depends on its chip area. Hence, in a digital camera which has a large number of pixels within a small area, the amount of light per unit pixel consequently decreases, and the sensitivity decreases, thus producing low-frequency noise. For example, low-frequency noise is often visually recognized as a pseudo mottled texture across several to ten-odd pixels on a portion such as a sheet of blue sky or the like which scarcely has any change in density (to be referred to as a "flat portion" hereinafter). Some digital cameras often produce false colors.

As a conventionally proposed noise removal method, a method using a median filter and a method using a low-pass filter (to be abbreviated as "LPF" hereinafter) that passes only a low-frequency range have prevailed.

In the method of using a median filter, a pixel value which assumes a central value (to be referred to as "median" hereinafter) is extracted from a region (to be referred to as "window" hereinafter) which includes a pixel of interest and its surrounding pixels, and the extracted median replaces the pixel value of interest. For example, many methods using a median filter such as Japanese Patent Laid-Open No. 4-235472 and the like have been proposed. Especially, when the pixel of interest is impulse noise or random noise, the median filter replaces the pixel value of interest as an isolated value having a low correlation with surrounding pixels by a median value with a high correlation to surrounding pixels, thereby removing the isolated value in original image information.

On the other hand, in the method using an LPF, the average value of a plurality of pixels around a pixel of interest to have the pixel of interest as the center is calculated, and replaces the pixel value of interest. FIG. 19 shows an example of a conventional LPF which calculates the average value of a plurality of pixels around a pixel of interest to have the pixel of interest as the center. This method is mainly effective for block distortion mentioned above. That is, since block distortion is noise that generates block-like steps different from signal components on a portion which is originally a flat portion, the steps can become hardly visible by moderating the gradients of the steps.

The aforementioned two noise removal methods can effectively work locally, but have adverse effects (blur of an edge portion and the like). Hence, many modifications of these methods have been proposed. For example, Japanese Patent Laid-Open No. 2001-245179 discloses a method of making product sum calculations by selecting only surrounding pixels which are approximate to the pixel value of interest upon calculating the average value, so as not to blur an image due to a noise removal filter process.

In addition to the above two methods, i.e., the method of using a median filter and the method using an LPF, many other methods that pertain to noise and distortion removal have been proposed. For example, Japanese Patent Laid-Open No. 8-56357 discloses a method of replacing signal values between pixels which are located on the two sides of the block boundary, so as to remove block distortion. Furthermore, Japanese Patent Laid-Open No. 10-98722 discloses a method of adding a predetermined pattern selected from a plurality of patterns based on a random number to pixel signal levels around the block boundary.

Moreover, Japanese Patent Laid-Open No. 7-75103 discloses a method of removing block distortion produced upon encoding by adding an error to the level value of a specific pixel of interest having the block boundary as the center. In addition, Japanese Patent Laid-Open No. 4-239886 discloses a method of removing noise by detecting maximum and minimum values from pixels which neighbor the pixel of interest, and selecting one of the maximum value, the minimum value, and the pixel value of interest using, as a control signal, the determination result indicating whether or not noise is contained therein, so as to remove white and black points having isolated values.

However, none of these conventional methods can exhibit a perfect noise removal effect of the aforementioned low-frequency noise. For example, the method using a median filter has only an effect of deleting an isolated value which has a low correlation with surrounding values, and the method using an LPF is effective only for high-frequency noise or white noise with high randomness by cutting off a high-frequency range. Hence, these methods are not effective for low-frequency noise, and the low-frequency noise remains unremoved.

The method described in Japanese Patent Laid-Open No. 8-56357 or the like, which aims at removing block distortion, can effectively reduce the deleterious effects of the steps by a method based on random number addition, a method of replacing pixel values between blocks or the like, as long as the block boundary is known, since block distortion to be removed is a high-frequency component generated as a rectangular step. However, the low-frequency noise to be removed is connectivity noise, i.e., pixel values which have fewer changes that successively appear across a broad range from several to ten-odd pixels, and the aforementioned technique that reduces block distortion cannot be directly applied. Of course, the generation position of noise is not known, unlike the block boundaries upon block encoding.

On the other hand, the method based on random number addition applies a pixel value which is not present in surrounding pixels. Hence, especially in a color image, when random numbers are added to respective color components obtained by color separation, a new color which is not present in surrounding pixels is generated, and deterioration of image quality, due to, for example, the generation of false colors or the like occurs.

Japanese Patent Laid-Open No. 7-203210 discloses an invention that reduces the signal strength of a specific frequency, although its object is different from noise removal of the present invention. In a system which receives a halftone dot document and executes dithering of a pseudo halftone process upon output, moiré is generated due to interference of the frequency of the input halftone dots and that of dithering. The invention described in Japanese Patent Laid-Open No. 7-203210 is a moiré removal method that removes the frequency of the input halftone dots to prevent the generation of moiré.

That is, this moiré removal method replaces the pixel value of interest by a pixel value which is located ahead of the pixel of interest by a distance corresponding to a predetermined number of pixels on a line, since it is effective to disturb a certain regularity exhibited by the image to change the frequency of halftone dots. The above invention discloses cases wherein the predetermined number of pixels is fixed and is randomly selected.

However, since this moiré removal method aims at disturbing a specific period corresponding to a peak, it is not completely effective for low-frequency noise, which is generated in a broad low-frequency range. Since this method replaces pixel values, density preservation is guaranteed, but that method is merely a process of changing the selected pixel value, i.e., spatially shifting pixel phases. Furthermore, since a change in a selected pixel value corresponds to cyclic filter characteristics, an impulse response becomes infinity. Even when the predetermined number of pixels as the distance between pixels to be replaced is randomly selected, since sampled pixels are replaced in turn, the moiré period is merely displaced by shifting peak phases of halftone dots, which are generated at specific periods.

As described above, none of the aforementioned prior art can effectively remove low-frequency noise components contained in image data.

SUMMARY OF THE INVENTION

The present invention has been proposed to solve the conventional problems, and has as its object to provide an image processing apparatus and image processing method, and a computer program, which can visually remove low-frequency noise contained in image data.

In order to achieve the above object, an image processing apparatus according to the present invention comprises input means for inputting image data containing low-frequency noise, designation means for designating a region made up of a predetermined pixel and surrounding pixels of the predetermined pixel in the image data, selection means for selecting a comparison pixel to be compared with the predetermined pixel from the region, determination means for determining a new pixel value of the predetermined pixel on the basis of pixel values of the comparison pixel and the predetermined pixel, and substitution means for generating new image data by substituting the new pixel value for the pixel value of the predetermined pixel.

The selection means selects the comparison pixel from the region using a random number.

The selection means uses the random number, which is generated on the basis of a uniform probability distribution.

The selection means uses the random number, which is generated on the basis of a generation probability distribution depending on the distance from the predetermined pixel.

The generation probability distribution has a higher generation probability with increasing distance from the predetermined pixel.

The selection means selects the comparison pixel from the region on the basis of a predetermined regularity.

The predetermined regularity varies a relative position from the predetermined pixel for each predetermined pixel.

The predetermined regularity determines a relative position from the predetermined pixel on the basis of an absolute coordinate position of the predetermined pixel.

The determination means determines the new pixel value of the predetermined pixel on the basis of a difference between the pixel values of the comparison pixel and the predetermined pixel.

The determination means determines the pixel value of the comparison pixel as the new pixel value of the predetermined pixel when the difference is not more than a predetermined value.

The determination means determines a value obtained by adding or subtracting a predetermined value to or from the pixel value of the predetermined pixel as the new pixel value of the predetermined pixel.

The image processing apparatus further comprises approximate color generation means for generating an approximate color which is approximate to the pixel value of the comparison pixel. The determination means uses the approximate color as the new pixel value of the predetermined pixel.

The approximate color generation means generates an approximate color, which is approximate to at least one of a plurality of color components within a predetermined range.

The determination means determines new pixel values of the predetermined pixel using the approximate color which is generated by an approximation within the predetermined range for at least one of a plurality of color components, and using pixel values of the comparison pixel for the remaining color components.

The determination means has two threshold values, determines the pixel value of the predetermined pixel as the new pixel value when the difference is smaller than a first threshold value, and determines the approximate color as the pixel value of the predetermined pixel when the difference for at least one of a plurality of color components is not less than the first threshold value and is smaller than a second threshold value.

The image processing apparatus according to the present invention also can comprise input means for inputting image data containing low-frequency noise, designation means for designating a region made up of a predetermined pixel and surrounding pixels of the predetermined pixel in the image data, selection means for selecting a comparison pixel to be compared with the predetermined pixel from the region, and determination means for determining a new pixel value of the predetermined pixel by a product sum calculation of pixel values of the comparison pixel and the predetermined pixel.

The determination means can determine the new pixel value of the predetermined pixel by interpolation of the comparison pixel and the predetermined pixel.

The determination means can determine the new pixel value of the predetermined pixel by extrapolation of the comparison pixel and the predetermined pixel.

A weighting coefficient in the product sum calculation is set on the basis of a difference between the pixel values of the comparison pixel and the predetermined pixel.

The product sum calculation uses different weighting coefficients in correspondence with a plurality of color components.

The determination means determines whether the differences for all of a plurality of color components are not more than a predetermined value.

The selection means can select a plurality of comparison pixels from the region, and the determination means determines the new pixel value of the predetermined pixel using the plurality of selected comparison pixels.

The image processing apparatus further comprises pseudo halftone means for executing a pseudo halftone process of the generated new image data using error diffusion.

Also, according to the present invention, an image processing apparatus for visually reducing noise components contained in a low-frequency range of image data, comprises correlation reduction means for reducing correlations between a predetermined pixel and surrounding pixels of the predetermined pixel in the image data, signal strength control means for controlling decreased signal strengths of low-frequency components upon reducing the correlations, and white noise conversion means for converting the decreased signal strengths into white noise components.

Furthermore, according to the present invention, an image processing apparatus for visually reducing noise components contained in a low-frequency range of image data, comprises correlation reduction means for reducing correlations between a predetermined pixel and surrounding pixels of the predetermined pixel in the image data, signal strength control means for controlling decreased signal strengths of low-frequency components upon reducing the correlations, broadband noise conversion means for converting the decreased signal strengths into broad-band noise components, and band width control means for controlling a band width of the broad-band noise conversion means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

An image processing apparatus which has a low-frequency noise removal function according to the first embodiment of the present invention, and generates print information to be output to a printer engine will be described below with reference to the accompanying drawings.

Note that the low-frequency noise removal function according to the present invention can be applied to various forms as a function in an image input device such as a digital camera, an image scanner, or the like, that in an image output device such as an ink jetprinter, a sublimatic printer, a laser printer, or the like, or that in a device driver or application software on a computer required to control these input/output devices.

Figure 1:
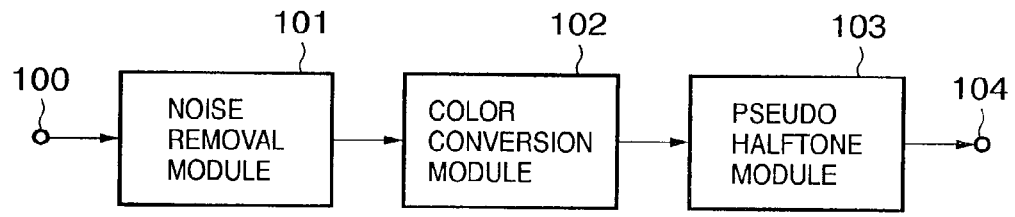
FIG. 1 is a block diagram showing the arrangement of an image processing apparatus which is implemented by applying a low-frequency noise function according to the present invention to a printer driver that generates print information to be output to a printer engine on a computer.

FIG. 1 is a block diagram showing the arrangement of an image processing apparatus which is implemented by applying a low-frequency noise function according to the present invention to a printer driver that generates print information to be output to a printer engine on a computer. As shown in FIG. 1, the image processing apparatus according to the present invention comprises an input terminal 100, a noise removal module 101, a color conversion module 102, a pseudo halftone module 103, and an output terminal 104.

Referring to FIG. 1, the input terminal 100 is an image information input module for inputting color image information from application software or the like. Color image information sensed by a digital camera or the like is normally encoded to a standard file format such as JPEG or the like before it is transmitted. Hence, in this embodiment, encoded color image information input to the input terminal 100 is output to the noise removal module 101 after it is rasterized to decoded raster data. Note that attribute information such as the model name of a digital camera, an image sensing scene, an image sensing mode, or the like is often output together with color image information.

The noise removal module 101 executes a noise removal process for color image information made up of color components R, G, and B. Note that the detailed arrangement and operation of the noise removal module 101 will be explained later.

The color conversion module 102 converts the noise-removed RGB image information output from the noise removal module 101 into information of color agents used upon recording by a printer. Note that four components C (cyan), M (magenta), Y (yellow), and K (black) are basically used as color agent components. Some ink-jet printers use inks with lower dye densities in addition to the above color agent components.

The pseudo halftone module 103 converts color image information, which has been separated into color agent components determined by the color conversion module 102, into quantization levels smaller in number than the number of gray levels of the color image information, and expresses gray-scale as an area by quantized values of a plurality of pixels. Assume that this embodiment adopts error diffusion that diffuses a quantization error of a pixel of interest to surrounding pixels as the pseudo halftone process. Note that a detailed description of error diffusion will be omitted since it is a state-of-the-art technique. Because error diffusion is a publicly known type of processing, the detailed explanation thereof is omitted.

The output terminal 104 is an output module which transmits quantized information for respective color agent components generated by the pseudo halftone module 103 to a printer engine (not shown). That is, the image processing apparatus according to the present invention comprises the pseudo halftone module 103 which converts generated new image data into pseudo halftone data using error diffusion.

Note that the arrangement of the image processing apparatus shown in FIG. 1 is used when color image information input from the input terminal 100 is output to a printer engine without changing the resolution. Also, in order to eliminate the difference between the resolutions of the printer engine and input color image information, a resolution conversion unit that makes resolution conversion by an interpolation process may be inserted between the noise removal module 101 and color conversion module 102.

Figure 2A:
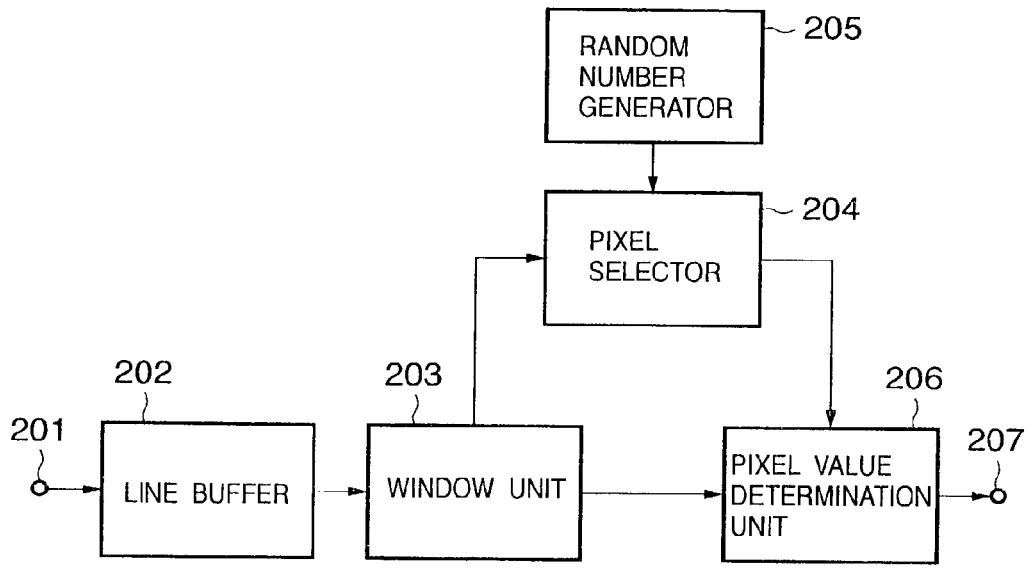
FIG. 2A is a block diagram showing the detailed arrangement of a noise removal module 101 shown in FIG. 1.

FIG. 2A is a block diagram showing the detailed arrangement of the noise removal module 101 shown in FIG. 1. As shown in FIG. 2A, the noise removal module 101 according to this embodiment comprises an input terminal 201, a line buffer 202, a window unit 203, a pixel selector 204, a random number generator 205, a pixel value determination unit 206, and an output terminal 207.

Referring to FIG. 2A, the input terminal 201 receives RGB color image information output from the input terminal 100 in FIG. 1. The line buffer 202 stores/holds the color image information input to the input terminal 201 for each line. The window unit 203 can form a 2D reference pixel window having a pixel of interest as the center since it has line buffers 202 for a plurality of lines.

The pixel selector 204 selects an arbitrary pixel from those which form the window on the basis of a pseudo random number generated by the random number generator 205. The pixel value determination unit 206 determines a new pixel value of the pixel of interest on the basis of the pixel of interest of the window unit 203, and the selected pixel selected by the pixel value selector 204.

Figure 2B:
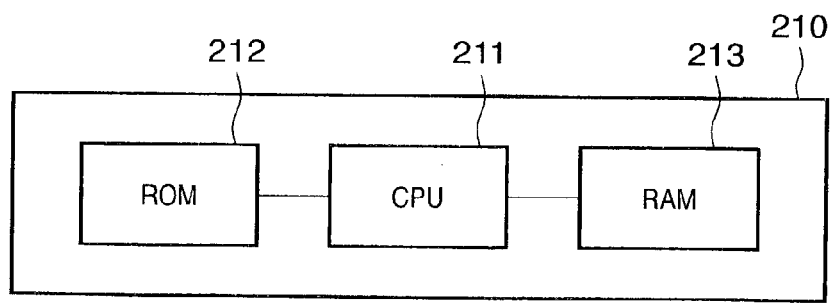
FIG. 2B is a block diagram showing a hardware arrangement that implements the noise removal module 101 shown in FIG. 1 as a noise removal device.

FIG. 2B shows the hardware arrangement upon implementing the noise removal module with the above arrangement as a noise removal device. A noise removal device 210 comprises a CPU 211, a ROM 212, and a RAM 213. In the noise removal device 210, the CPU 211 controls the operations of the respective units of the aforementioned noise removal module 101 in accordance with a control program held by the ROM 212. The RAM 213 is used as a work area of the CPU 211.

Figure 3:
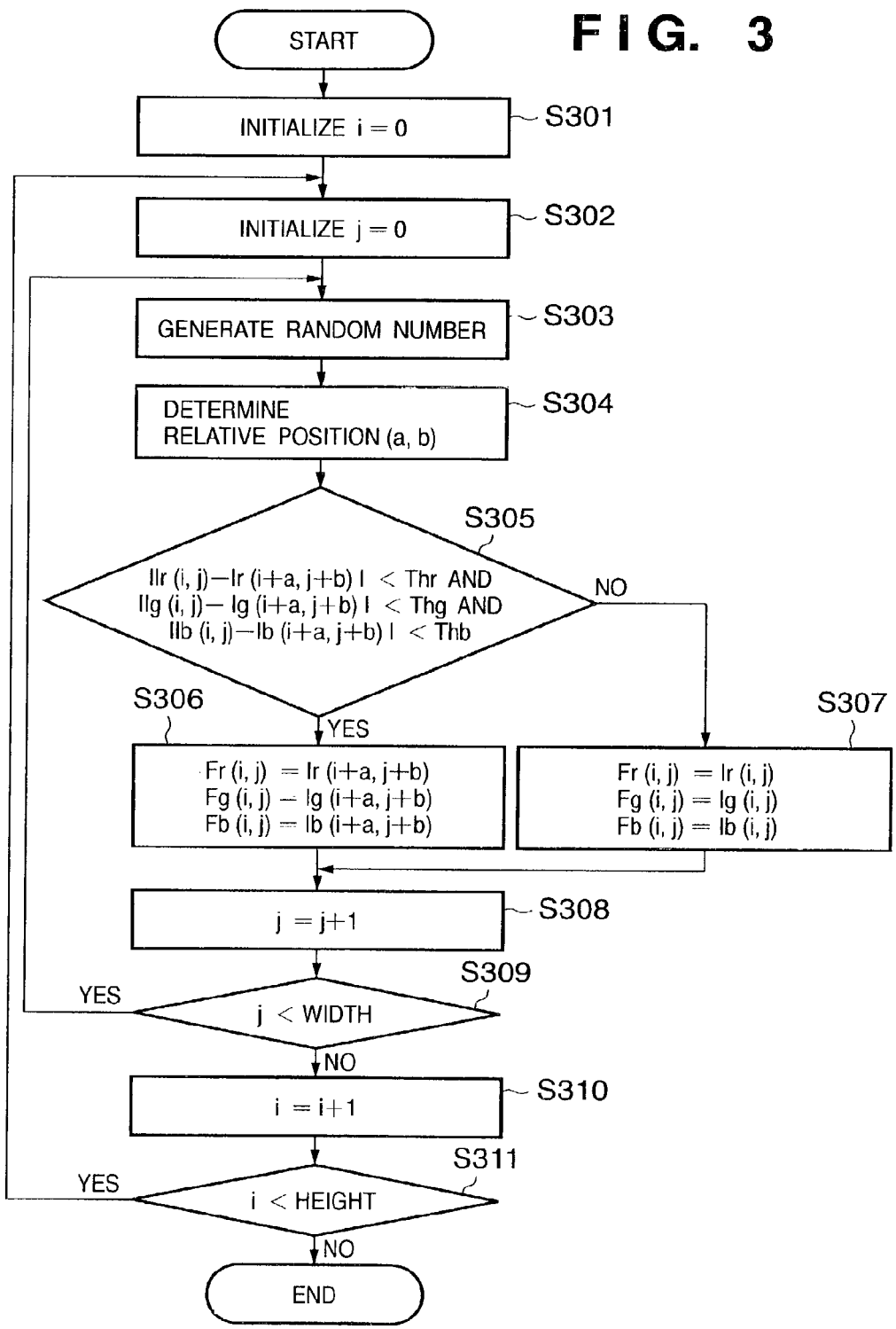
FIG. 3 is a flowchart for explaining the operation sequence of the noise removal module 101.

The operation of the noise removal module 101 with the above arrangement will be described below. FIG. 3 is a flowchart for explaining the operation sequence of the noise removal module 101. Assume that color image information input to the noise removal module 101 represents an image having a size of the number of horizontal pixels=WIDTH×the number of vertical pixels=HEIGHT.

The noise removal module 101 is initialized. In practice, the CPU 211 resets variable i indicating a vertical processing address to zero (step S301). Likewise, the CPU 211 resets variable j indicating a horizontal processing address to zero (step S302).

The random number generator 205 generates a random number (step S303). The pixel selector 204 determines the values of horizontal and vertical relative positions a and b from the pixel of interest on the basis of the random number generated by the random number generator 205 (step S304). Upon determining horizontal and vertical relative positions a and b, two random numbers may be independently generated, or two variables may be calculated by a random number which is generated once. The random number generation algorithm is not particularly limited, but is assumed to be probabilistically uniform. That is, the noise removal module 101 according to the present invention is characterized by selecting a selected pixel from the window using a random number. Also, the pixel selector 204 uses a random number generated based on a uniform probability distribution.

Note that the values of horizontal and vertical relative positions a and b are selected not to exceed the window size. For example, if the window size is 9×9 pixels having the pixel of interest as the center, values a and b are set using a remainder calculation based on the generated random number to fall within the ranges $-4 \leq a \leq 4$ and $-4 \leq b \leq 4$.

Using values a and b determined in step S304, the pixel selector 204 makes a comparison (step S305) to see whether or not:

$$|Ir(i,j)-Ir(i+a,j+b)|<Thr \text{ and}$$

$$|Ig(i,j)-Ig(i+a,j+b)|<Thg \text{ and}$$

$$|Ib(i,j)-Ib(i+a,j+b)|<Thb$$

where $Ir(i, j)$ is the pixel value of the R component of the pixel of interest located at a coordinate position $(i, j)$, $Ig(i, j)$ is the pixel value of the G component, and $Ib(i, j)$ is the pixel value of the B component. Also, Thr, Thg, and Thb are respectively predetermined R, G, and B threshold values. Furthermore, $|x|$ is the absolute value of x.

That is, it is determined in step S305 whether or not the absolute values of the differences between three, R, G, and B component values of a selected pixel arbitrarily selected from the window, and those of the pixel of interest of become smaller than the predetermined threshold values.

If it is determined as a result of comparison that all the three, R, G, and B component values become smaller than the predetermined threshold values (Yes in step S305), the pixel selector 204 substitutes the selected pixel values as new values of the pixel of interest (step S306). Assume that Fr, Fg, and Fb represent new R, G, and B component values of the pixel of interest.

On the other hand, if not all the three, R, G, and B component values become smaller than the predetermined threshold values (No in step S305), the pixel selector 204 uses the old values of the pixel of interest as new values (step S307). Hence, no substitution of the values of the pixel of interest is made in this case. That is, the pixel value determination unit 206 of the noise removal module 101 determines a new pixel value of a pixel of interest on the basis of the difference between the pixel values of a selected pixel and the pixel of interest. Also, when the difference is equal to or smaller than a predetermined value, the pixel value determination unit 206 determines the selected pixel value as the pixel value of the pixel of interest.

The horizontal address is counted up for one pixel (step S308). Then, a series of processes are repeated while scanning the pixel of interest one by one until the horizontal pixel position reaches the (WIDTH)-th pixel (step S309). Likewise, the vertical address is counted up for one pixel (step S310). Then, a series of processes are repeated while scanning the pixel of interest one by one until the vertical pixel position reaches the (HEIGHT)-th pixel (step S311). Upon completion of scans for all pixels, the noise removal process ends.

The principle of noise removal according to this embodiment will be described below.

Figure 4:
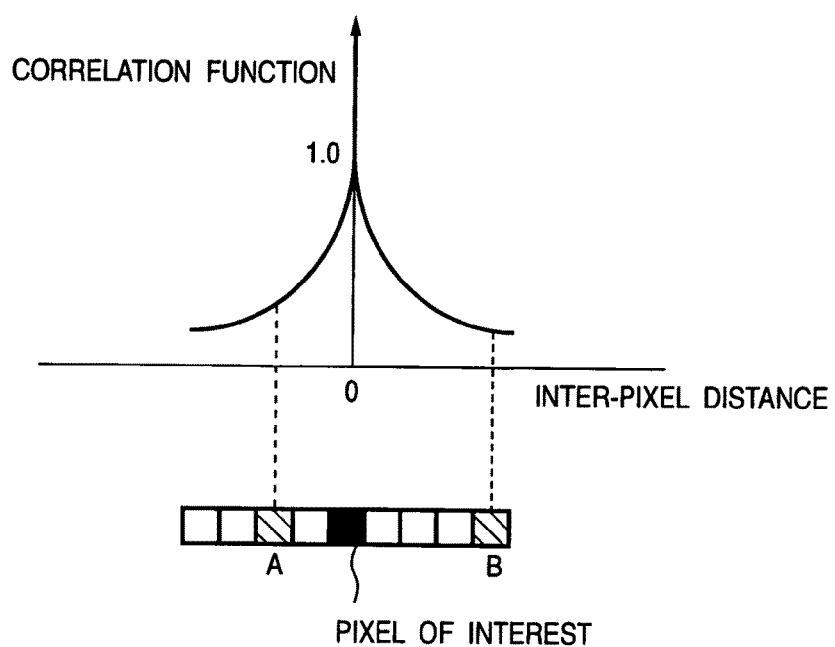
FIG. 4 shows a model of the relationship between the spatial distance from a pixel of interest, and a corresponding autocorrelation function.

FIG. 4 shows a model of the relationship between the spatial distance from the pixel of interest, and a corresponding autocorrelation function. FIG. 4 shows the graph of the relationship between the autocorrelation function and inter-pixel distance in an upper portion, and the state of a pixel sequence in a lower portion. Note that FIG. 4 shows only a linear pixel sequence for the sake of simplicity.

As is known, the autocorrelation function exponentially decreases as the relative position with respect to the pixel of interest increases. For example, pixels at positions A and B in FIG. 4 have different autocorrelation functions with the pixel of interest. That is, since pixels in the window have different correlation functions depending on the distances from the pixel of interest, substituting the pixel value of interest amounts to selecting a pixel with an arbitrary correlation from a set of different correlation function values. Therefore, when pixels are selected in a uniform probability distribution irrespective of correlation values, nearly random correlations are obtained after substitution, thus implementing conversion into white noise.

Figure 5:
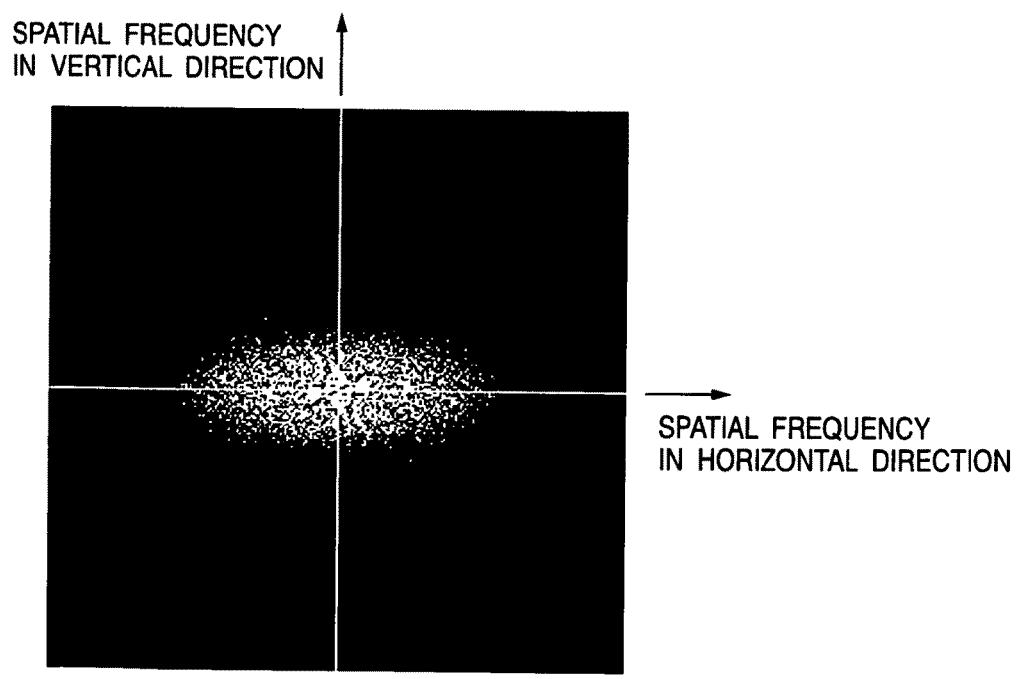
FIG. 5 shows the frequency characteristics obtained by clipping a local region where low-frequency noise is generated from arbitrary image information, and transforming the clipped region using DFT (discrete Fourier transformation)

FIG. 5 shows the frequency characteristics obtained by clipping a local region where low-frequency noise is generated from arbitrary image information, and converting that region using DFT (discrete Fourier transformation). In FIG. 5, the origin represents a DC component, the ordinate plots the spatial frequency in the vertical direction, and the abscissa plots the spatial frequency in the horizontal direction. Higher-frequency components appear as they are farther away from the origin in both the horizontal and vertical directions.

In FIG. 5, white dots represent signal strengths (power spectrum) in predetermined frequency components, and more white dots are plotted with increasing signal strength. Note that the clipped region shown in FIG. 5 corresponds to a flat portion, and has a small number of AC signal components other than noise components. More specifically, frequency components with high strength in the low-frequency range in FIG. 5 are generated by noise and, hence, the generation of noise stands out very much and deteriorates the image quality.

Figure 6:
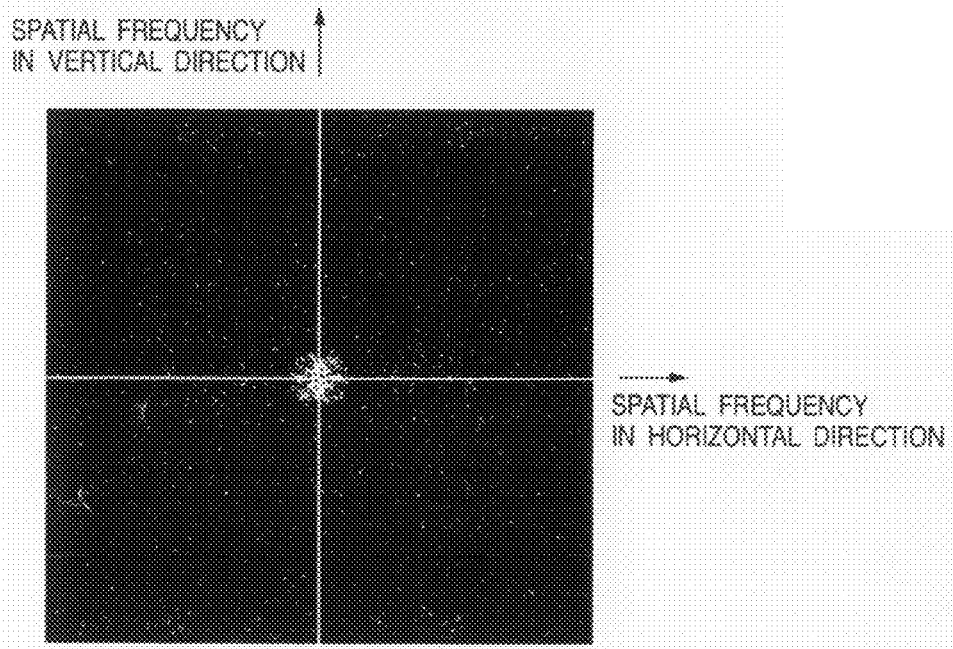
FIG. 6 shows the frequency characteristics after the region shown in FIG. 5 has undergone a noise removal process using the operation sequence shown in the flowchart of FIG. 3.

FIG. 6 shows the frequency characteristics after the region shown in FIG. 5 has undergone the noise removal process using the operation sequence shown in the flowchart in FIG. 3. As can be seen from FIG. 6, low-frequency signal components which are generated on the central portion of FIG. 5 are reduced, and white noise components which spread over the respective frequency ranges are generated.

Figure 7A:
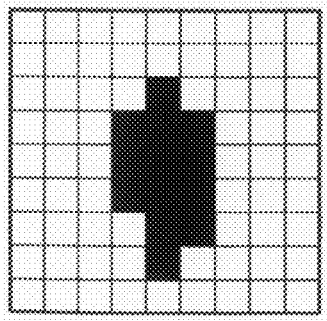
FIGS. 7A and 7B show models of low-frequency noise before and after the noise removal process on a real space.
Figure 7B:
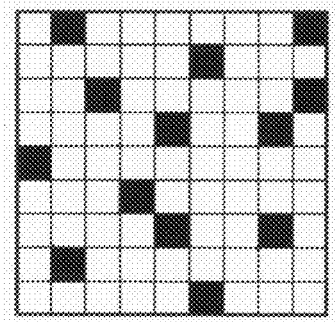

FIGS. 7A and 7B show models of low-frequency noise components before and after the noise removal process on a real space. In FIGS. 7A and 7B, one box represents one pixel, which is expressed by two gray levels for the sake of simplicity. At first, assume that low-frequency noise is visually recognized as a cluster with connectivity, as shown in FIG. 7A. By selecting pixels from positions inside/outside the cluster with connectivity, and substituting them, connectivity is lost, as shown in FIG. 7B. That is, noise visually recognized as a "continent"-like shape is broken up into "island"-like components and, as a result, the former "continent"-like noise disappears. Therefore, white noise expressed on the frequency characteristic graph in FIG. 6 can be considered as a result of decomposition of "continent"-like noise into "island"-like components of various sizes.

Figure 8:
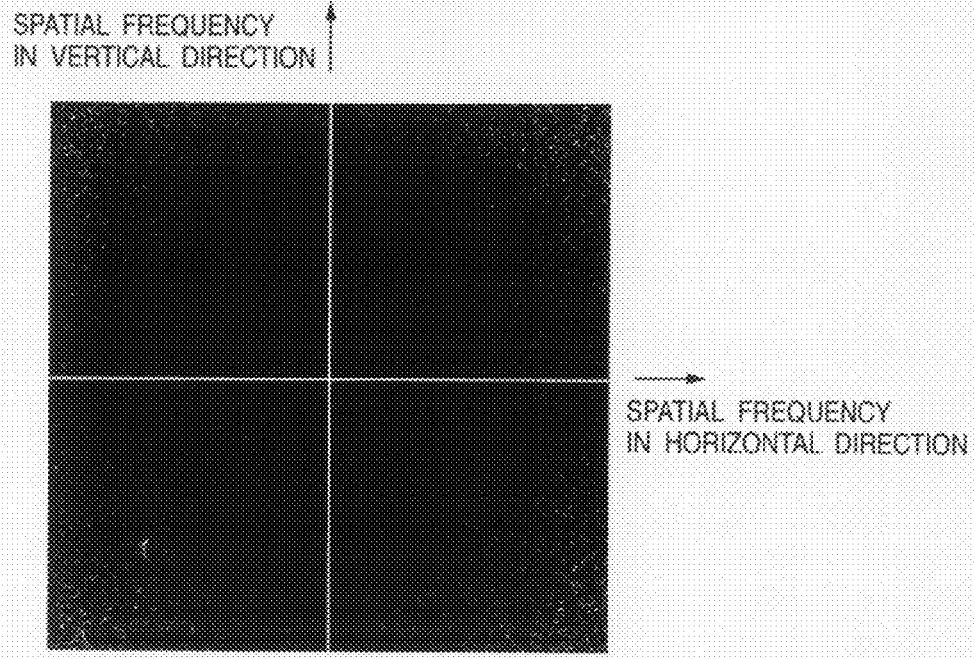
FIG. 8 shows the frequency characteristics after the region shown in FIG. 5 has undergone the noise removal process using the operation sequence shown in the flowchart of FIG. 3, and also a pseudo halftone process based on error diffusion.

FIG. 8 shows the frequency characteristics after the region shown in FIG. 5 has undergone the noise removal process using the operation sequence shown in the flowchart of FIG. 3, and also a pseudo halftone process based on error diffusion. As is known, error diffusion exhibits the characteristics of a broad-band high-pass filter (HPF). That is, as can be seen from FIG. 8, white noise explained using FIGS. 7A and 7B become hardly visible in the presence of high-frequency noise generated by error diffusion. Furthermore, since the MTF (Modulation Transfer Function) of the human visual characteristics is attenuated with increasing frequency, white noise generated by noise removal can hardly be recognized on a print, which is output to a printer engine.

Adverse effects upon converting low-frequency components into white noise will be explained below.

Figure 9A:
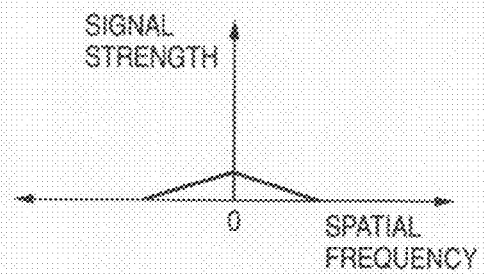
FIGS. 9A and 9B show models of the frequency characteristics of flat and non-flat portions.
Figure 9B:
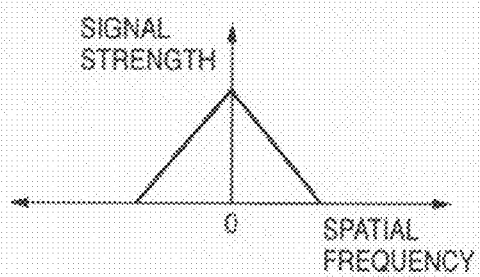

FIGS. 9A and 9B show models of the frequency characteristics of flat and non-flat portions. FIG. 9A shows a model of the frequency characteristics of a completely flat portion where pixel values change less. FIG. 9B shows a model of the frequency characteristics of a portion (non-flat portion) where pixel values change slowly and do not form a steep edge. Both FIGS. 9A and 9B are expressed linearly for the sake of simplicity. In FIGS. 9A and 9B, the abscissa plots the spatial frequency, and the ordinate plots the signal strength. Also, the origin indicates a DC component. Furthermore, assume that low-frequency noise is generated in both the regions of FIGS. 9A and 9B.

In this case, in the example shown in FIG. 9A, signal components other than the DC component are small, and most AC signal components are generated due to low-frequency noise. The example shown in FIG. 9B shows the total signal strength of signal components of the non-flat portion and low-frequency noise, and the signal strength in FIG. 9B is overwhelmingly higher than the low-frequency noise strength shown in FIG. 9A. That is, assuming that the strength of low-frequency noise is constant, the S/N ratio as a relative ratio between the signal strength and noise strength becomes higher in a region where a change in pixel value is large, while the S/N ratio becomes lower in a region where the change width of pixel values is small and noise is dominant.

Figure 10A:
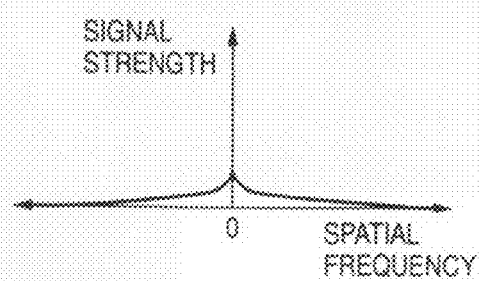
FIGS. 10A and 10B show models of the frequency characteristics after the portions shown in FIGS. 9A and 9B have undergone the noise removal process using the operation sequence shown in the flowchart of FIG. 3.
Figure 10B:
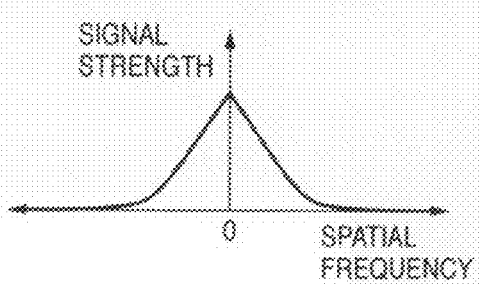

FIGS. 10A and 10B show models of the frequency characteristics after the portions shown in FIGS. 9A and 9B have undergone the noise removal process using the operation sequence shown in the flowchart of FIG. 3. As can be seen from comparison with FIG. 9A, in FIG. 10A, the "mountain" of the low-frequency power strength breaks up, and low-frequency noise can be converted into white noise components which spread up to the high-frequency range. However, the sum total of the DC and AC signal strengths of respective frequencies remains the same.

Upon comparison of FIG. 10B with FIG. 9B, the degree that "mountain" of the low-frequency power strength breaks up is relatively small unlike in FIG. 10A. Note that the degree that the "mountain" of the low-frequency power strength breaks up depends on the relative ratio between the original low-frequency signal strength and a signal strength converted into white noise by the noise removal process. That is, even when a region where signal components are large undergoes the noise removal process using the operation sequence shown in the flowchart of FIG. 3, only noise components superposed on the signal components can be effectively converted without any adverse influence such as a large change in original signal component.

As described in the operation sequence shown in the flowchart of FIG. 3, when the difference between the values of the selected pixel and pixel of interest is large, no substitution is executed (step S307). In other words, by setting the threshold value used to determine whether or not to substitute, a signal strength to be converted into white noise can be controlled. Assume that the threshold value is constant irrespective of signal component values. In this case, in a region where the change amount is large, since the difference between the values of the pixel of interest and the selected pixel increases, such large differences appear in high probability, and the number of pixels which undergo a substitution process probabilistically decreases.

As can be seen from this, the adverse influence of the noise removal process in a region where the change amount is large is small. On the other hand, in a region where the change amount is small, the number of pixels which undergo a substitution process probabilistically increases. Hence, the noise removal process effectively works in this region.

That is, a noise removal module 101 according to this embodiment comprises an input terminal 201 for inputting image data containing noise-frequency noise, a window unit 203 for designating a window made up of a pixel of interest and its surrounding pixels, a pixel selector 204 for selecting a selected pixel to be compared with the pixel of interest from the window, and a pixel value determination unit 206 for determining a new pixel value of the pixel of interest on the basis of the pixel value of the selected pixel and that of the pixel of interest, and that new image data is generated by substituting new pixel value for the pixel value of the pixel of interest.

As described above, the technique according to the present invention converts noise present in a visually conspicuous frequency range into a hardly visible frequency range. As a similar technique, a spread spectrum technique in a communication method that spreads signal components in a specific frequency range to a broader frequency range by multiplying them by a pseudo random number sequence (PN sequence) is known. However, according to the present invention, low-frequency noise removal using a conversion technique with a higher degree of freedom can be implemented by a simpler arrangement.

That is, since correlations are reduced using the aforementioned substitution process, some signal components in a low-frequency range can be reliably converted into a high-frequency range. In this case, by optimizing the window size of selected pixels, which correspond to a partial set of auto-correlation functions, the bandwidth of high-frequency broad-band noise to which the low-frequency noise strength is converted can be controlled. By controlling the allowable amount of substitution, the signal strength of noise to be converted from low-frequency signal components can be controlled.

Second Embodiment

Figure 11:
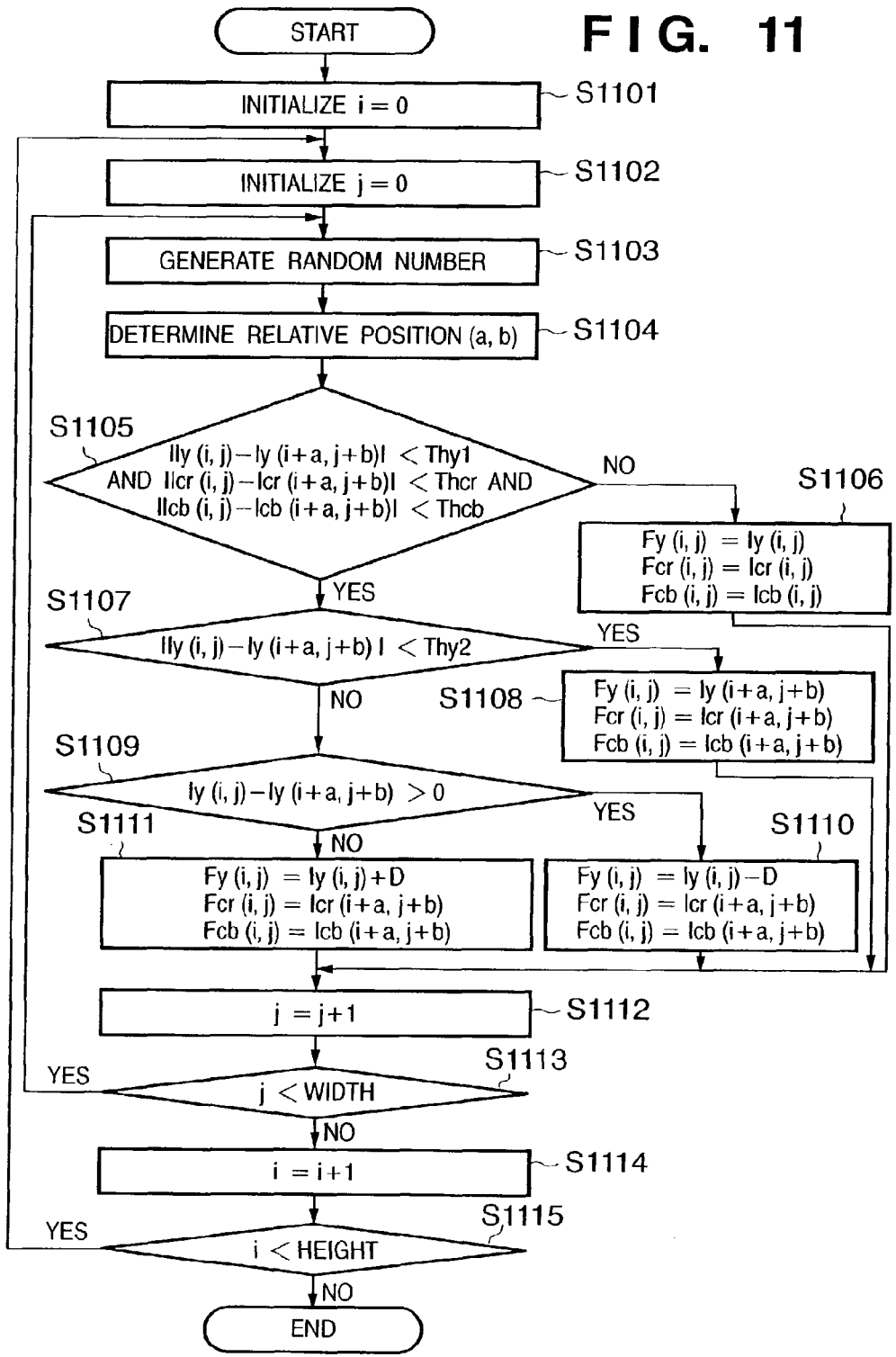
FIG. 11 is a flowchart for explaining the operation sequence of a noise removal module according to the second embodiment of the present invention.

FIG. 11 is a flowchart for explaining the operation sequence of a noise removal module according to the second embodiment of the present invention. Note that the arrangements of the image processing apparatus and the noise removal module according to the second embodiment are the same as those in the block diagrams shown in FIGS. 1 and 2. In the second embodiment, a color space on which the noise removal module 101 executes noise removal is a YCrCb color space as a luminance-color difference space in place of the RGB color space.

Note that conversion from R, G, and B into Y, Cr, Cb is not the gist of the present invention, and a description thereof will be omitted. Therefore, the RGB space may be converted into the YCrCb space before input to the noise removal module 101, or YUV signals as luminance and color difference signals decoded by the JPEG algorithm may be used intact.

As shown in FIG. 11, the noise removal module 101 resets variable i indicating a vertical processing address to zero (step S1101). Likewise, variable j indicating a horizontal processing address is reset to zero (step S1102). Furthermore, the random number generator 205 generates a random number (step S1103) The pixel selector 204 determines the values of horizontal and vertical relative positions a and b from the pixel of interest on the basis of the generated random number (step S1104).

Moreover, using the determined values a and b, the pixel selector 204 makes comparison (step S1105) to see whether or not:

$$|Iy(i,j)-Iy(i+a,j+b)|<Thy1 \text{ and}$$

$$|Icr(i,j)-Icr(i+a,j+b)|<Thcr \text{ and}$$

$$|Icb(i,j)-Icb(i+a,j+b)|<Thcb$$

where Iy(i, j) is the pixel value of the Y component of the pixel of interest located at a coordinate position (i, j), Icr(i, j) is the pixel value of the Cr component, and Icb(i, j) is the pixel value of the Cb component. Also, Thy1, Thcr, and Thcb are respectively predetermined Y, Cr, and Cb threshold values. Furthermore, |x| is the absolute value of x.

That is, it is determined in step S1105 whether or not the absolute values of the differences between three, Y, Cr, and Cb component values of a selected pixel arbitrarily selected from the window, and those of the pixel of interest of become smaller than the predetermined threshold values.

If it is determined as a result of the comparison that all the three, Y, Cr, and Cb component values do not simultaneously become smaller than the predetermined threshold values (No in step S1105), the old values of the pixel of interest are used as new values of the pixel of interest (step S1106). That is, no substitution of the values of the pixel of interest is made in this case. Assume that Fy, Fcr, and Fcb represent new Y, Cr, and Cb component values of the pixel of interest.

On the other hand, if it is determined that all the Y, Cr, and Cb component values become smaller than the predetermined threshold values (Yes in step S1105), the absolute value of the difference between the Y component values of the selected pixel and the pixel of interest is compared with a threshold value Thy2, which is set for only the Y component (step S1107). Note that Thy1<Thy2.

As a result, if the Y component is smaller than the predetermined threshold value (Yes in step S1107), the Y, Cr, and Cb component values of the selected pixel are set as new values of the pixel of interest (step S1108). On the other hand, if the Y component is not smaller than the predetermined threshold value (No in step S1107), the Y component values of the selected pixel and the pixel of interest are compared (step S1109). If the value of the pixel of interest is larger than that of the selected pixel as a result of comparison (Yes in step S1109), the following conversion is made (step S1110):

$$Fy(i,j)=Iy(i,j)-D,$$

$$Fcr(i,j)=Icr(i+a,j+b),$$

$$Fcb(i,j)=Icb(i+a,j+b), \quad (1)$$

where D is a predetermined value, and D Thy2 is often used.

On the other hand, if the value of the selected pixel is larger than that of the pixel of interest (No in step S1109), the following conversion is made (step S1111):

$$Fy(i,j)=Iy(i,j)+D,$$

$$Fcr(i,j)=Icr(i+a,j+b),$$

$$Fcb(i,j)=Icb(i+a,j+b) \quad (2)$$

Subsequently, the horizontal address is counted up for one pixel (step S1112).

That is, the pixel value determination unit 206 of the noise removal module 101 determines a new pixel value for the pixel of interest by adding or subtracting a predetermined value to or from the pixel value of the pixel of interest. Also, the noise removal module 101 is characterized by further comprising an approximate color generation function of generating an approximate color, which is approximate to the pixel value of a selected pixel, and in that the pixel value determination unit 206 uses the generated approximate color as the new pixel value of the pixel of interest. Furthermore, the noise removal module 101 is such that the approximate color generation function generates an approximate color which is approximate to at least one of a plurality of color components within a predetermined range.

Moreover, the pixel value determination unit 206 of the noise removal module 101 determines new pixel values of the pixel of interest using an approximate color which is generated by an approximation within a predetermined range for at least one of a plurality of color components, and using the pixel values of the selected pixel for the remaining color components.

In addition, the pixel value determination unit 206 of the noise removal module 101 has two threshold values, sets a new pixel value as the pixel value of the pixel of interest when a difference is smaller than the first threshold value, and sets an approximate color as the pixel value of the pixel of interest when a difference for at least one of a plurality of color components is equal to or larger than the first threshold value but is smaller than the second threshold value.

Then, a series of processes are repeated while scanning the pixel of interest one by one until the horizontal pixel position reaches the (WIDTH)-th pixel (step S1113). Likewise, the vertical address is counted up for one pixel (step S1114). Then, a series of processes are repeated until the vertical pixel position reaches the (HEIGHT)-th pixel (step S1115).

FIGS. 12A to 12D show examples of categories of comparison in the sequence shown in the flowchart of FIG. 11. Note that FIGS. 12A to 12D explain the Y and Cr components in two dimensions for the sake of simplicity. Also, in FIGS. 12A to 12D, variable D mentioned above is set to D=Thy2.

Figure 12A:
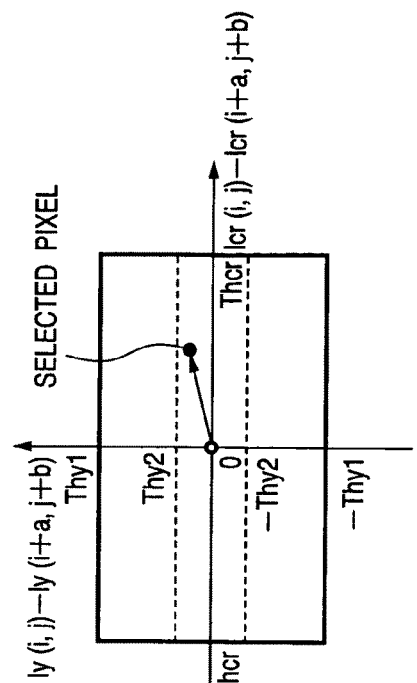
FIGS. 12A, 12B, 12C, and 12D are views for explaining examples of categories of comparison in the sequence shown in the flowchart of FIG. 11.

FIG. 12A explains the categories. In FIG. 12A, the ordinate plots the difference (Iy(i, j)−Iy(i+a, j+b)) between the Y component values of the pixel of interest and the selected pixel, and the abscissa plots the difference (Icr(i, j)−Icr(i+a, j+b)) between the Cr component values of the pixel of interest and the selected pixel. Note that the origin indicates a case wherein the values of the pixel of interest and the selected pixel are equal to each other, since the difference becomes zero. A rectangular region bounded by the bold line in FIG. 12A satisfies:

$$-Thy1<Iy(i,j)-Iy(i+a,j+b)<Thy1 \text{ and}$$

$$-Thcr<Icr(i,j)-Icr(i+a,j+b)<Thcr$$

Also, in FIG. 12A, a hatched rectangular region satisfies:

$$-Thy2<Iy(i,j)-Iy(i+a,j+b)<Thy2 \text{ and}$$

$$-Thcr<Icr(i,j)-Icr(i+a,j+b)<Thcr$$

The operation sequence shown in the flowchart of FIG. 11 is roughly classified into three categories. Hence, the hatched region is classified as category A, a region other than the region of category A in the bold rectangular region is classified as category B, and a region other than the bold rectangular region is classified as category C in FIG. 12A.

Figure 12B:
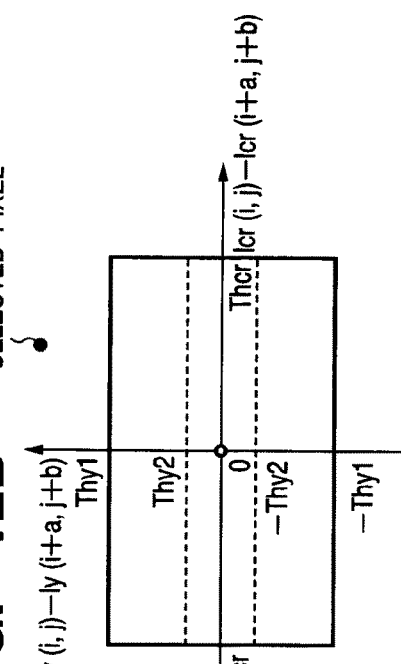

FIG. 12B shows an example when the selected pixel is present within category A. In FIG. 12B, the pixel of interest is indicated by a white dot, and the selected pixel is indicated by a black dot. With the operation sequence shown in the flowchart of FIG. 11, new values of the pixel of interest shift from the origin, and are substituted by those of the selected pixel.

Figure 12C:
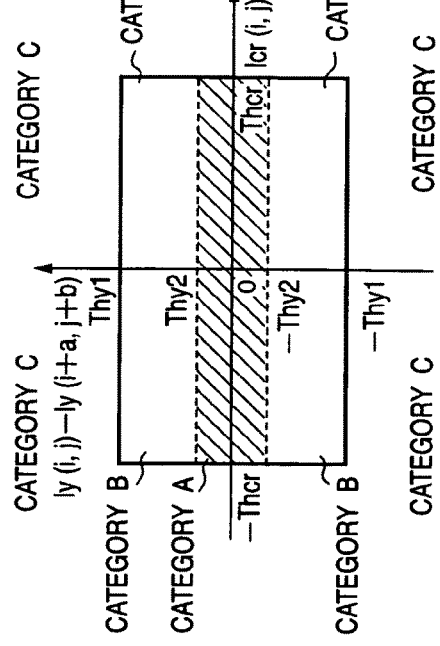

FIG. 12C shows an example when the selected pixel is present within category B. With the operation sequence shown in the flowchart of FIG. 11, a new value of the pixel of interest shifts from the origin, but does not exceed Thy2 indicated by the broken line. Hence, only the Y component is clipped to the upper limit (Thy2). On the other hand, a new Cr component value is substituted by that of the selected pixel.

Figure 12D:
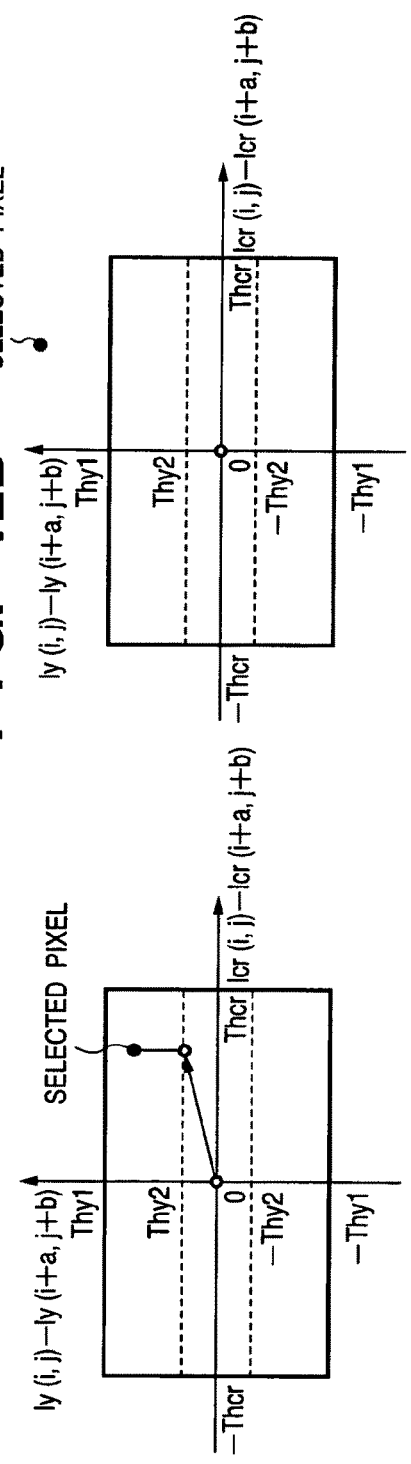

FIG. 12D shows an example when the selected pixel is present within category C. In this case, with the operation sequence shown in the flowchart of FIG. 11, the pixel of interest does not shift from the origin.

This embodiment is particularly effective for luminance and color difference components. The human visual sensitivity level to a luminance component is largely different from those to color difference components; the luminance component is more sensitive to a change amount. As described above, the present invention breaks up low-frequency noise and generates white noise instead. In this case, the strength level of a luminance perceived as a noise is largely different from those of color differences.

More specifically, the white noise strength depends on a threshold value as an allowable value indicating whether or not to substitute. If a large allowable value is set for a luminance component, the white noise strength increases, and causes deterioration of the image quality. For this reason, the substitution allowable amount of the luminance component must be set to a low level so that the image quality is free from deterioration. However, when the operation sequence shown in the flowchart of FIG. 3 is applied to the luminance-color difference space, the luminance component of the selected pixel does not become equal to or lower than the low threshold value as the allowable amount of the luminance component, and three components are often not substituted consequently.

That is, the color difference components are to be positively substituted, but the number of pixels to be substituted probabilistically decreases due to the limited allowable amount of the luminance component. To avoid such a problem, the luminance and color difference components can independently undergo selection and substitution processes. However, in this case, a color which is not present in surrounding pixels is generated as in the random number addition described in the prior art, thus generating false colors. Hence, in this embodiment, the upper limit of a change amount upon substitution is set for the luminance component in addition to the threshold value as the substitution allowable amount. That is, since multi-level threshold value comparison processes are executed, the color difference components are positively substituted, and the luminance component changes from the value of the pixel of interest.

In the above method, however, since the values of the selected pixel are not directly substituted, a false color which is not generated in surrounding pixels may be generated. However, compared to a case wherein the luminance and color difference components independently undergo selection and substitution processes, a color change vector from the pixel of interest to a converted pixel value is approximate to that from the pixel of interest to the selected pixel, and deterioration of the image quality can be suppressed.

Figure 13A:
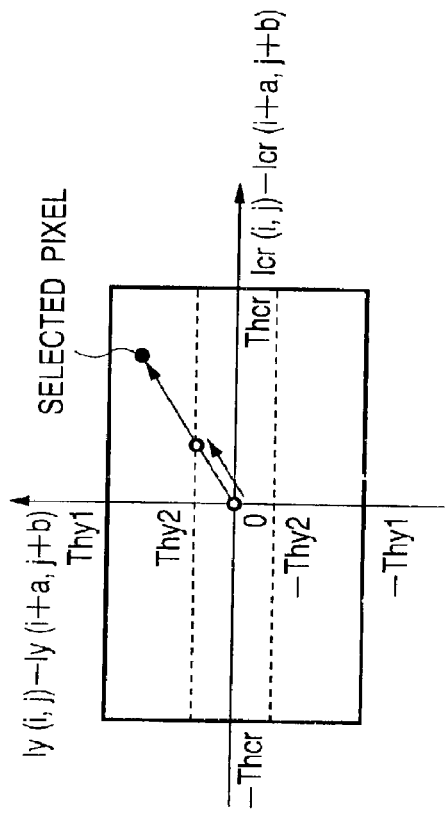
FIGS. 13A and 13B are views for explaining a color change vector between two colors of the pixel of interest and a selected pixel, or of the pixel of interest and a replacement pixel.
Figure 13B:
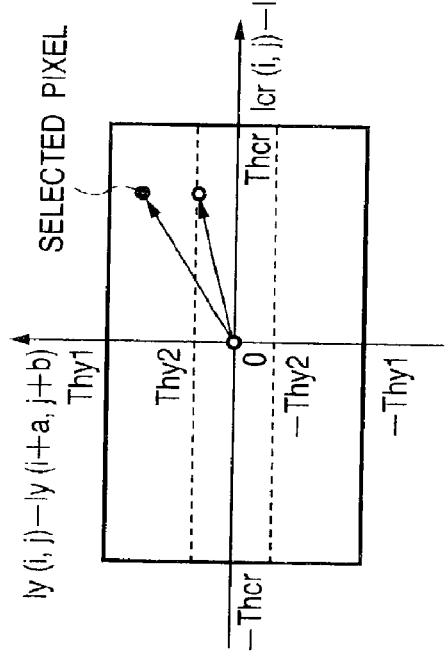

FIGS. 13A and 13B are views for explaining a color change vector between two colors of the pixel of interest and selected pixel, or of the pixel of interest and replacement pixel. FIG. 13A shows a color change vector between two colors of the pixel of interest and the selected pixel, and a color change vector between two colors of the pixel of interest and the converted pixel. As in FIGS. 12A to 12D, the pixel of interest is indicated by a white dot, and the selected pixel is indicated by a black dot. As shown in FIG. 13A, the color change vectors of the above pixels are approximate to each other.

When priority is given to prevention of false color generation, a method of calculating a color change vector from the pixel of interest to the selected pixel first, and setting an intersection between this color change vector and the threshold value Thy2 of the Y component as a new value of the pixel of interest may be used, as shown in FIG. 13B. More specifically, FIG. 13B shows an example, when priority is given to the vector direction over the vector strength. That is, if the vector directions of colors agree with each other, no conspicuous false color is generated. The intersection can be calculated by linear interpolation between the two colors of the pixel of interest and selected pixel.

That is, various approximate color generation means may be proposed depending on methods of generating a color approximate to that of the selected pixel while satisfying a change allowable amount condition between two points of the pixel of interest and selected pixel. In FIG. 13A, such generation means is implemented by clipping only one component of a color. In FIG. 13B, the generation means is implemented by linearly changing other components in conjunction with clipping of one component.

As described above, in this embodiment, when the pixel of interest cannot be substituted by a probabilistically selected pixel since the allowable amount condition is exceeded, an approximate color which is approximate to the color of the selected pixel is generated, and is determined as a new value of the pixel of interest. Note that FIGS. 13A and 13B show two example of the approximate color generation methods. However, the present invention is not limited to such specific methods.

Third Embodiment

Figure 14:
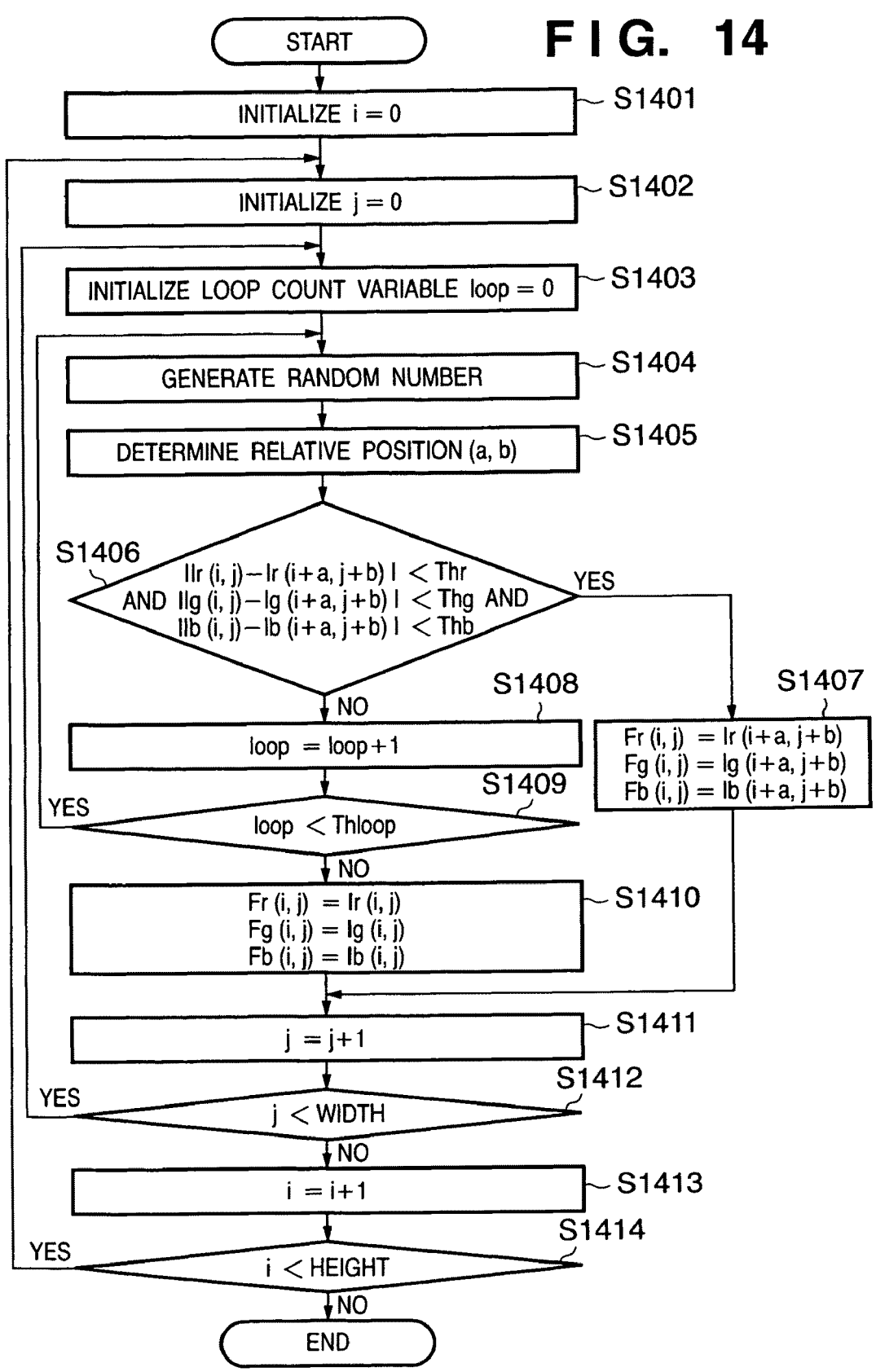
FIG. 14 is a flowchart for explaining the operation sequence of a noise removal module according to the third embodiment of the present invention.

FIG. 14 is a flowchart for explaining the operation sequence of a noise removal module according to the third embodiment of the present invention. Note that FIG. 14 shows another example of the operation sequence of the noise removal module 101 shown in FIG. 2.

As shown in FIG. 14, the noise removal module is initialized to reset variable i indicating a vertical processing address to zero (step S1401). Likewise, variable j indicating a horizontal processing address is reset to zero (step S1402). Also, a loop count is initialized to reset variable loop indicating a selectable loop count per pixel of interest (step S1403).

The random number generator 205 generates a random number (step S1404). The pixel selector 204 determines the values of horizontal and vertical relative positions a and b from the pixel of interest on the basis of the generated random number (step S1405). Using the determined values a and b, a comparison is made (step S1406) to see whether or not:

$|Ir(i,j)-Ir(i+a,j+b)|<Thr$ and $|Ig(i,j)-Ig(i+a,j+b)|<Thg$ and $|Ib(i,j)-Ib(i+a,j+b)|<Thb$ where Ir(i, j) is the pixel value of the R component of the pixel of interest located at a coordinate position (i, j), Ig(i, j) is the pixel value of the G component, and Ib(i, j) is the pixel value of the B component. Also, Thr, Thg, and Thb are respectively predetermined R, G, and B threshold values. Furthermore, |x| is the absolute value of x.

If the comparison result in step S1406 is Yes, the selected pixel values are substituted as new values of the pixel of interest (step S1407). Assume that Fr, Fg, and Fb represent new R, G, and B component values of the pixel of interest.

On the other hand, if the comparison result in step S1406 is No, the loop count variable loop is counted up by 1 (step S1408). It is checked if the loop count variable loop is smaller than a predetermined value (Thloop) (step S1409). As a result, if the variable loop is smaller than the predetermined value (Yes in step S1409), the aforementioned processes are repeated from the random number generation step in step S1404. On the other hand, if the variable loop is equal to the predetermined value (No in step S1409), the old values of the pixel of interest are used as new values, and no substitution is made (step S1410).

In this embodiment, the number of substituted pixels can be increased using repetition. That is, when a steep edge and impulse noise having an isolated value are present together with low-frequency noise within the window, the value of the selected pixel is often largely different from that of the pixel of interest. With the operation sequence shown in the flowchart of FIG. 3, the selected pixel is determined by generating a random number once per pixel of interest. However, in this embodiment, since a pixel value within an allowable range is more likely to be selected by repeating the processes a plurality of number of times, low-frequency noise can be removed more satisfactorily.

Fourth Embodiment

Figure 15:
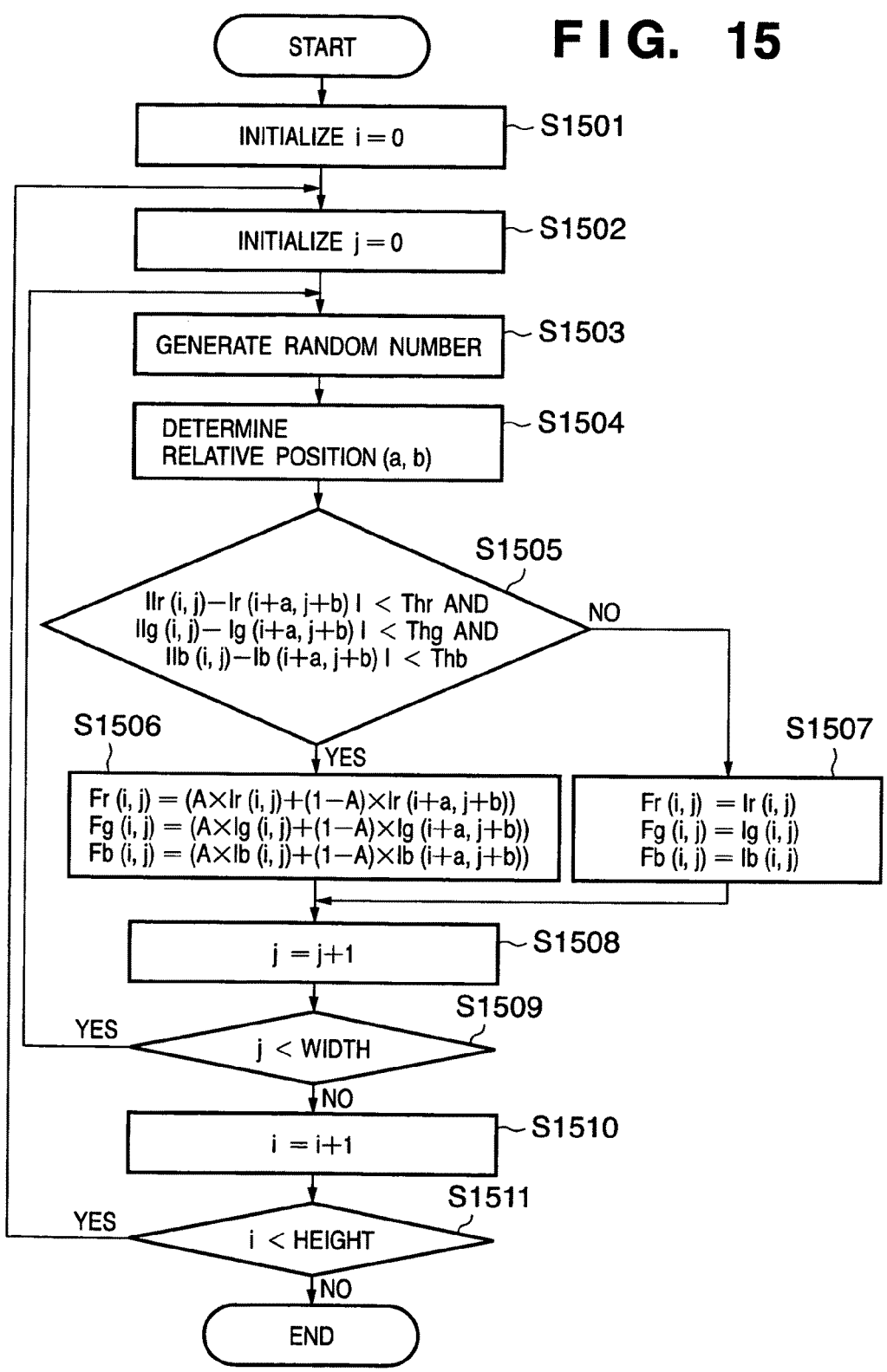
FIG. 15 is a flowchart for explaining the operation sequence of a noise removal module according to the fourth embodiment of the present invention.

FIG. 15 is a flowchart for explaining the operation sequence of a noise removal module according to the fourth embodiment of the present invention. Note that FIG. 15 shows still another example of the operation sequence of the noise removal module 101 shown in FIG. 2.

As shown in FIG. 15, the noise removal module is initialized to reset variable i indicating a vertical processing address to zero (step S1501). Likewise, variable j indicating a horizontal processing address is reset to zero (step S1502). The random number generator 205 generates a random number (step S1503). The pixel selector 204 determines the values of horizontal and vertical relative positions a and b from the pixel of interest on the basis of the generated random number (step S1504). Using the determined values a and b, a comparison is made (step S1505) to see whether or not:

$|Ir(i,j)-Ir(i+a,j+b)|<Thr$ and $|Ig(i,j)-Ig(i+a,j+b)|<Thg$ and $|Ib(i,j)-Ib(i+a,j+b)|<Thb$ where Ir(i, j) is the pixel value of the R component of the pixel of interest located at a coordinate position (i, j), Ig(i, j) is the pixel value of the G component, and Ib(i, j) is the pixel value of the B component. Also, Thr, Thg, and Thb are respectively predetermined R, G, and B threshold values. Furthermore, |x| is the absolute value of x.

If the comparison result in step S1505 is Yes, new values of the pixel of interest are calculated (step S1506) by:

$Fr(i,j)=A \times Ir(i,j)+(1-A) \times Ir(i+a,j+b)$ $Fg(i,j)=A \times Ig(i,j)+(1-A) \times Ig(i+a,j+b)$ $Fb(i,j)=A \times Ib(i,j)+(1-A) \times Ib(i+a,j+b)$ (3)

where A is a predetermined coefficient.

On the other hand, if the comparison result in step S1505 is No, the old values of the pixel of interest are used as new values and no substitution is made (step S1507). That is, in this embodiment, the calculation results of the product sum calculations are used as the new values of the pixel of interest in place of substitution of the values of the selected pixel.

A conventional LPF is used to calculate the weighted mean of neighboring pixels to have the pixel of interest as the center. Also, the LPF is used to cut off a high-frequency region by a filtering process using weighting coefficients depending on spatial distances between the pixel of interest and neighboring pixels.

On the other hand, the object of the present invention is not to cut off the high-frequency region but to remove low-frequency noise by converting some components of the low-frequency strength into the white noise strength. In the processing operation shown in the flowchart of FIG. 3 above, surrounding pixels are probabilistically selected and substituted irrespective of correlation values with the pixel of interest, thereby breaking the correlations with neighboring characteristics. However, if many selected pixels have values equal to or higher than the threshold value as an allowable amount, the ratio of pixels to be substituted decreases, and the effect is reduced.

Hence, this embodiment has as its object to increase the ratio of conversion of the values of the pixel of interest by adopting the product sum calculation results of the selected pixel and the pixel of interest as converted values in place of substituting the selected pixel. That is, a noise removal module 101 according to the present invention comprises a window unit 203 for designating a region made up of a pixel of interest and its surrounding pixels of image data which contains low-frequency noise, a pixel selector 204 for selecting a selected pixel to be compared with the pixel of interest from the region, and a pixel value determination unit 206 for determining a new pixel value of the pixel of interest by a product sum calculation of pixel values of the selected pixel and the pixel of interest.

For example, when a maximum allowable change amount of the pixel of interest is specified, if the value of coefficient A of equations (3) is set to A=1/2, the comparison threshold value of the product sum calculations becomes twice as large as the maximum allowable change amount. Therefore, the probability of conversion of the pixel of interest obviously increases.

FIG. 13B above corresponds to a case wherein the value of coefficient A in equations (3) is dynamically varied in correspondence with the difference between the pixel of interest and selected pixel, although color components are different. That is, FIG. 13B corresponds to a case wherein A=0 is equivalently set until a predetermined difference value, and when the difference becomes equal to or larger than the predetermined difference value, the value of coefficient A increases monotonously.

When the value of coefficient A in equations (3) is set to meet 0<A≦1 (A=0 is equivalent to substitution), such case corresponds to spatially linear interpolation between the pixel of interest and the selected pixel. More specifically, the pixel value determination unit 206 is characterized by determining a new pixel value by interpolation between the selected pixel and pixel of interest. Conversely, when the value of coefficient A in equations (3) is set to a negative value, such case corresponds to spatially linear extrapolation between the pixel of interest and selected pixel. That is, the pixel value determination unit 206 is characterized by determining a new pixel value by extrapolation between the selected pixel and pixel of interest.

Figure 16:
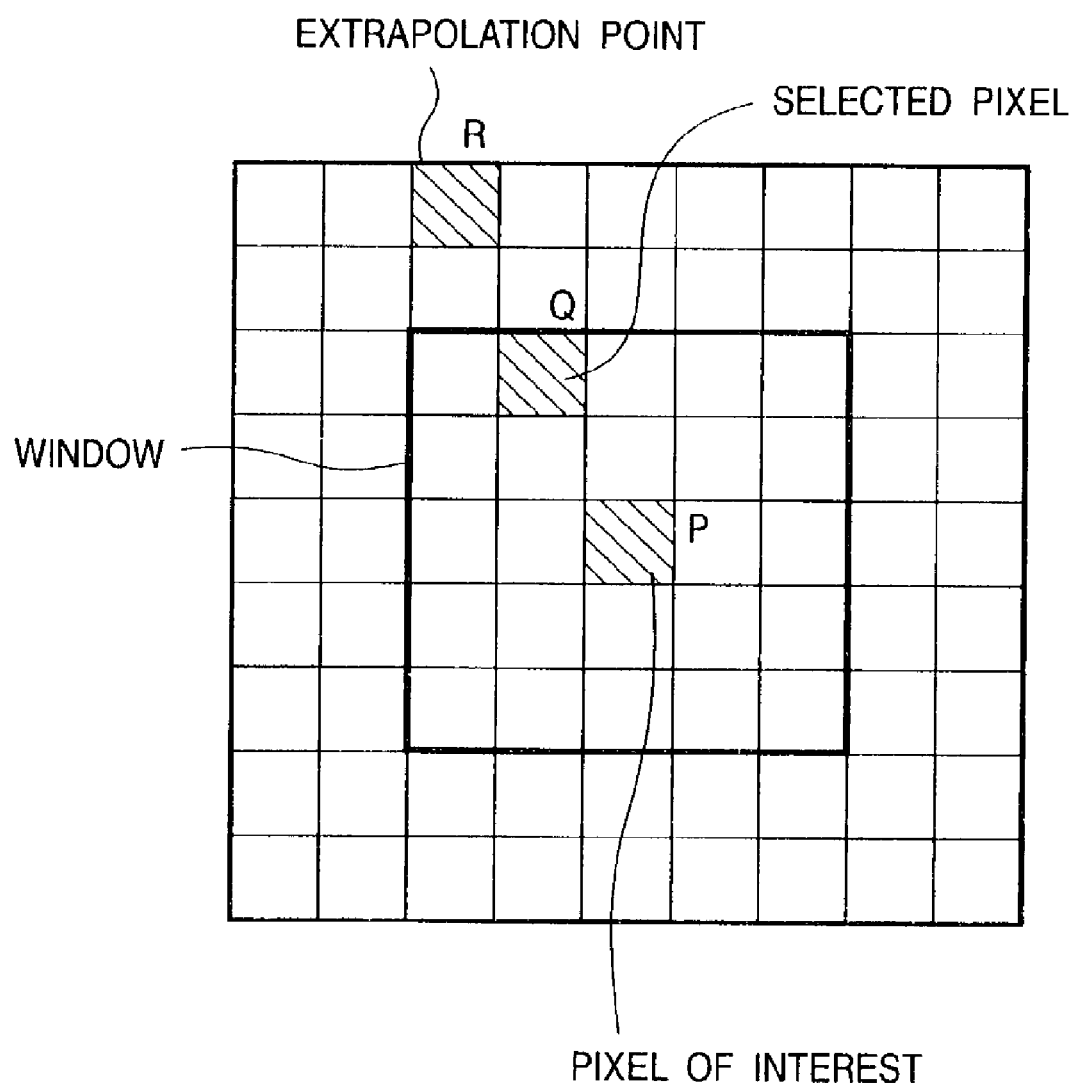
FIG. 16 shows the concept of extrapolation done in the fourth embodiment.

FIG. 16 shows the concept of extrapolation made in this embodiment. As shown in FIG. 16, assume that the window size is 5×5 pixels, and the position of central portion P is the pixel of interest. Also, assume that a pixel at point Q in the window is probabilistically selected using a random number.

If the value of coefficient A in equations (3) is set to −1, calculations given by equations (3) correspond to linear extrapolation, i.e., to calculation of the extrapolated value of extrapolation point R outside the window. That is, when the extrapolated value corresponding to the pixel position outside the window is used as the converted value, an effect close to that obtained by a substitution process by setting a large window size can be obtained. Note that the window size is determined by the number of line buffers, and can impose large software and hardware limitations. Hence, it is preferable to obtain a larger effect using a smaller window size.

As described above, according to this embodiment, by optimizing the coefficient of the product sum calculations, when interpolation is used, an effect of increasing the ratio of conversion of the pixel of interest can be obtained; when extrapolation is used, an effect similar to that obtained using a larger window size can be obtained. Furthermore, the above interpolation and extrapolation are implemented by linear calculations, but may be implemented by nonlinear calculations in accordance with the difference between the pixel values of the pixel of interest and the selected pixel. That is, in the present invention, a weighting coefficient in a product sum calculation is set based on the difference between the pixel values of the selected pixel and the pixel of interest.

As for coefficient A in equations (3), the same coefficient values are used for three, R, G, and B components. Alternatively, different coefficients may be used for respective color components. Furthermore, in this embodiment, the number of pixels to be selected is one pixel, but a plurality of pixels may be selected. When a plurality of pixels are selected, random numbers corresponding in number to the selected pixels are preferably generated.

That is, in the present invention, different weighting coefficients in the product sum calculation are used in correspondence with a plurality of color components. In the noise removal module 101 according to the present invention the pixel value determination unit 206 determines, for each of the plurality of color components, whether the difference is equal to or smaller than a predetermined value. Furthermore, in the noise removal module 101, the pixel selector 204 can select a plurality of pixels from a window, and the pixel value determination unit 206 determines the new pixel value of the pixel of interest using the plurality of selected pixels.

Since the effect of the present invention is reduced if the value of A as the weighting coefficient for the pixel of interest becomes large, if the number of selected pixels is n (n≧1), it is preferable that the contribution ratio of the value of the pixel of interest to the converted value is equal to or lower than 1/(n+1). In addition, a plurality of pixels may be selected, and the new value of the pixel of interest may be determined by only the product sum calculations among the selected pixels without using the pixel of interest.

Fifth Embodiment

Figure 17:
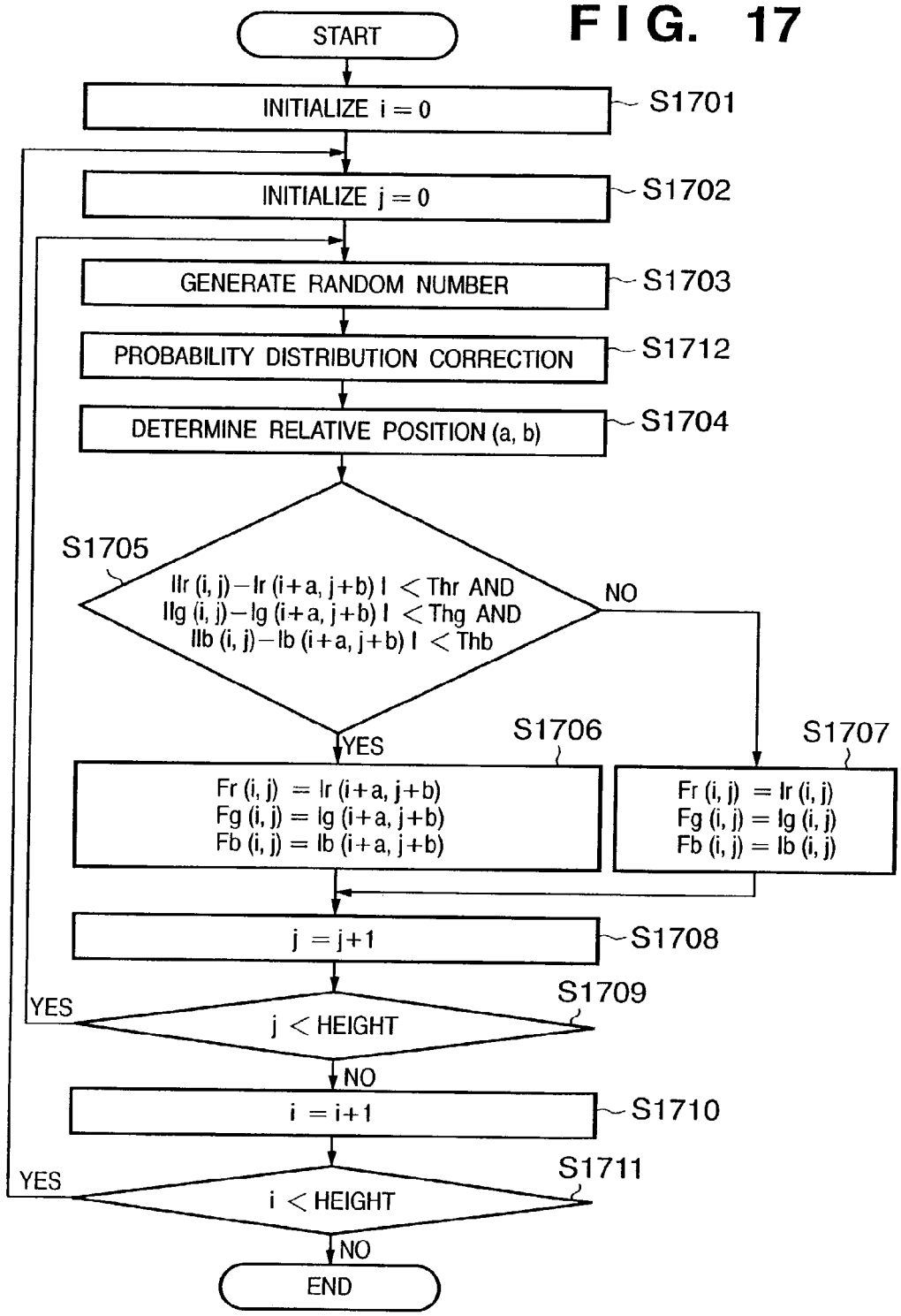
FIG. 17 is a flowchart for explaining the operation sequence of a noise removal module according to the fifth embodiment of the present invention.

FIG. 17 is a flowchart for explaining the operation sequence of a noise removal module according to the fifth embodiment of the present invention. Note that FIG. 17 shows still another example of the operation sequence of the noise removal module 101 shown in FIG. 2.

Since only some steps in FIG. 17 are different from those in the operation sequence of the flowchart shown in FIG. 3, only differences will be explained below. In FIG. 17, the probability distribution correction step as step S1712 is inserted after the uniform random number generation step as step S1703. That is, the probability distribution correction process in step S1712 corrects a uniform probability distribution after the random number is generated to a desired probability distribution. In this probability distribution correction process, a probability upon selecting a pixel is varied depending on the spatial distance from the position of the pixel of interest.

Figure 18B:
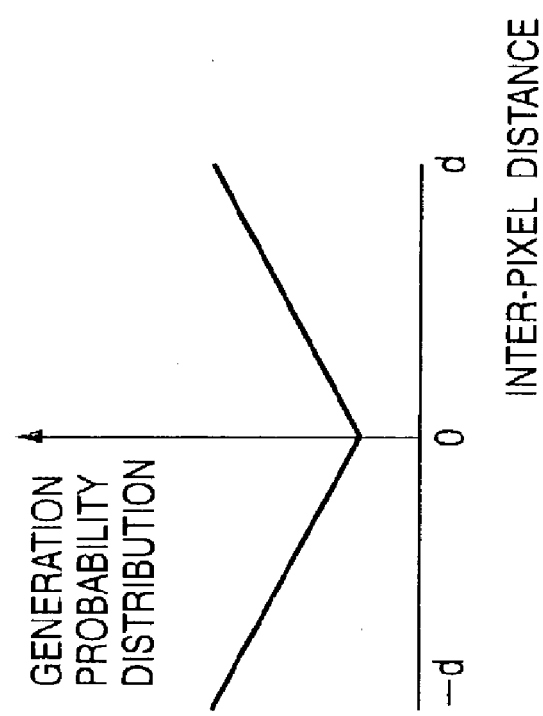
FIGS. 18A and 18B are views for explaining an outline of probability distribution correction done in step S1704.
Figure 18A:
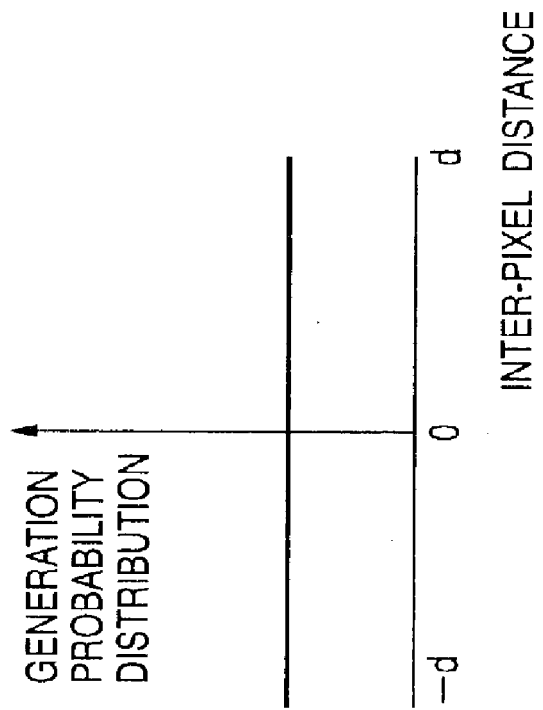
Figure 19:
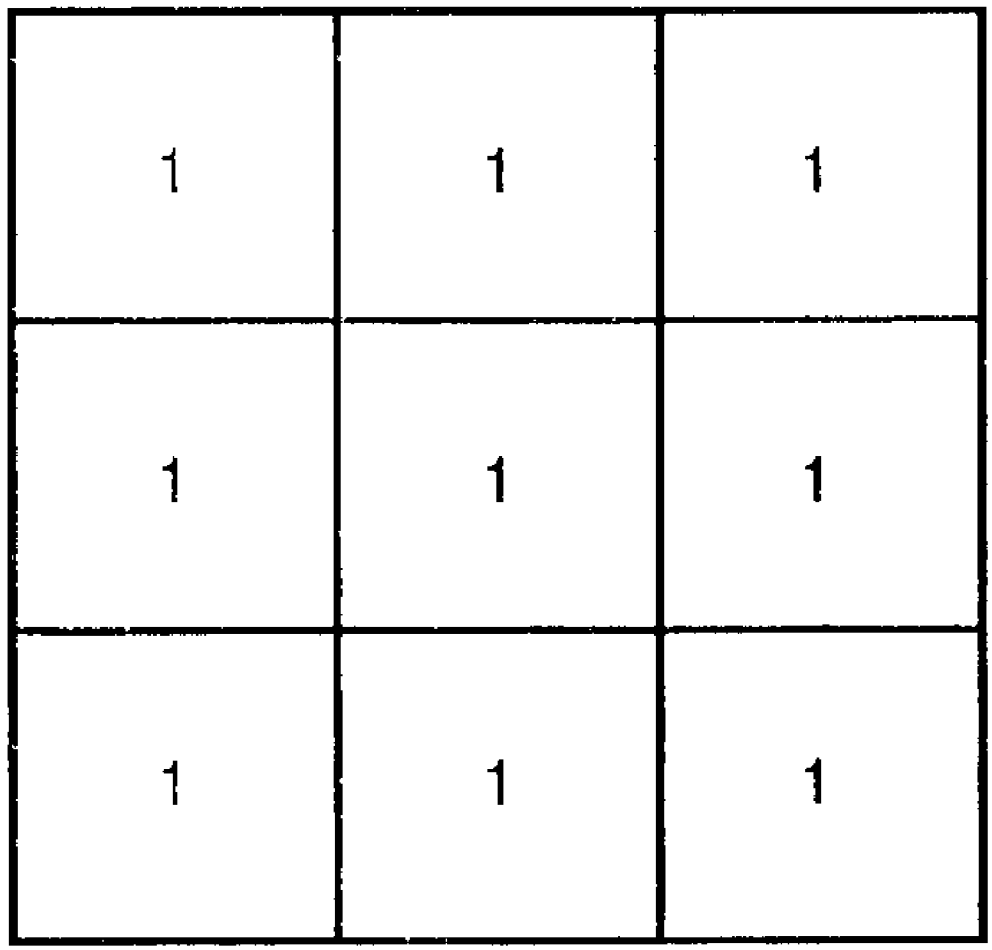
FIG. 19 shows an example of a conventional LPF used to calculate the average value of a pixel of interest and its surrounding pixels to have the pixel of interest as the center.

FIGS. 18A and 18B are views for explaining an outline of the probability distribution correction executed in step S1712. FIGS. 18A and 18B show a linear generation probability distribution for the sake of simplicity. In both FIGS. 18A and 18B, the abscissa plots the inter-pixel distance between the pixel of interest and the selected pixel, and the ordinate plots the probability distribution. Assuming that the window size in a one-dimensional direction is (2d+1) pixels, a remainder calculation is made so that the generated random number assumes a value falling within the range from −d (inclusive) to d (inclusive). Note that FIG. 18A shows a state wherein the generation probability within the range from −d (inclusive) to d (inclusive) is uniform. FIG. 18B shows a state wherein the generation probability increases with increasing absolute value of d. This indicates that a pixel is selected more easily with increasing spatial distance from the position of the pixel of interest.

That is, the pixel selector 204 of the noise removal module 101 according to the present invention is characterized by using a random number generated based on a generation probability distribution which depends on the distance from the pixel of interest. Also, in the present invention, this generation probability distribution has a higher generation probability with increasing distance from the pixel of interest.

When the probability upon selecting a pixel changes depending on the distance from the pixel of interest, correlations between the pixel of interest and selected pixel can be controlled. That is, assuming that the autocorrelation function changes in correspondence with the distance from the pixel of interest, as shown in FIG. 4, flexible setups that increase/decrease the generation probability in correspondence with desired correlations to be selected can be implemented. Note that the generation probability is preferably set by experiments. FIG. 18B exemplifies a case wherein the probability distribution linearly changes with respect to the distance from the pixel of interest. Of course, the probability distribution may change nonlinearly.

The method of determining a new value of the pixel of interest on the basis of a probabilistically selected pixel and the pixel of interest has been explained. In this method, either one or a plurality of pixels may be selected. In the above example, substitution or conversion is switched by evaluating the absolute value of the difference between the selected pixel and the pixel of interest. However, the present invention is not limited to such specific evaluation.

The present invention has exemplified a case wherein a selected pixel is probabilistically determined from surrounding pixels using a generated random number. Alternatively, the pixel position to be selected may be controlled by specifying a predetermined regularity in place of generating a random number. That is, it is not preferable to always select a pixel at a fixed relative position from the position of the pixel of interest in terms of image quality. Hence, a method of specifying a regularity that varies the relative position by predetermined coordinate positions every time the pixel of interest scans one pixel, and determining a selected pixel in turn based on the variation regularity is effective. The predetermined coordinate positions in the variation regularity may have a fixed variation amount (e.g., n pixels in the horizontal direction, and m pixels in the vertical direction), or the variation amount itself may be a nonlinear variation amount which is variable for respective pixels.

In place of specifying the regularity of the variation amount, the relative position may be determined based on a regularity function of an absolute coordinate position (i, j) of the pixel of interest. The regularity function may be stored in a table or may be determined by calculations.

The present invention is directed to a noise removal module which visually reduces noise components contained in the low-frequency range of image data, and in which correlations between a pixel of interest and surrounding pixels in the image data are reduced to control decreased signal strengths of low-frequency components upon reducing the correlations and to convert the decreased signal strengths to white noise.

Furthermore, the present invention is directed to a noise removal module which visually reduces noise components contained in the low-frequency range of image data, and in which correlations between a pixel of interest and surrounding pixels in the image data are reduced to control decreased signal strengths of low-frequency components upon reducing the correlations, to convert the decreased signal strengths to broad-band noise, and to control the band width of broad-band noise conversion means.

The objects of the present invention are also achieved by supplying a storage medium (or recording medium), which records a program code of software that can implement the functions of the above-mentioned embodiments to a system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) or the like running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the present invention, by determining a new value of a pixel of interest on the basis of the pixel of interest, and a pixel which is probabilistically selected from those around the pixel of interest, low-frequency noise contained in image data can be visually removed by converting the generated low-frequency noise strength into the white noise strength.

Since the band width of noise and the strength of noise after conversion can be controlled, it is easy to adjust the image quality by noise removal. Since a pixel value substitution process and approximate color conversion process allow conversion free from generation of conspicuous false colors, satisfactory noise removal can be executed even for a color image. Furthermore, since a high-image quality noise removal process can be implemented by a simple arrangement, a system arrangement that outputs an image sensed by a digital camera to a printer can provide a high-quality digital print that suffers less noise.

The present invention is not limited to the above embodiments and various changes and modifications can be made within the spirit and scope of the present inventions. Therefore, to apprise the public of the scope of the present invention, the following claims are made.

What is claimed is:

1. An image processing apparatus for visually reducing noise components contained in a low-frequency range of image data, comprising:
   correlation reduction means for reducing correlations between a predetermined pixel and surrounding pixels of the predetermined pixel in the image data;
   signal strength control means for controlling decreased signal strengths of low-frequency components of the image data upon reducing the correlations; and
   white noise conversion means for converting the low-frequency components of decreased signal strength into white noise components.

2. An image processing apparatus for visually reducing noise components contained in a low-frequency range of image data, comprising:
   correlation reduction means for reducing correlations between a predetermined pixel and surrounding pixels of the predetermined pixel in the image data;
   signal strength control means for controlling decreased signal strengths of low-frequency components of the image data upon reducing the correlations;
   broad-band noise conversion means for converting the low-frequency components of decreased signal strength into broad-band noise components; and
   band width control means for controlling a band width of said broad-band noise conversion means.

3. An image processing method for visually reducing noise components contained in a low-frequency range of image data, comprising:
   a correlation reduction step of reducing correlations between a predetermined pixel and surrounding pixels of the predetermined pixel in the image data;
   a signal strength control step of controlling decreased signal strengths of low-frequency components of the image data upon reducing the correlations; and
   a white noise conversion step of converting the low-frequency components of decreased signal strength into white noise components.

4. An image processing method for visually reducing noise components contained in a low-frequency range of image data, comprising:
   a correlation reduction step of reducing correlations between a predetermined pixel and surrounding pixels of the predetermined pixel in the image data;
   a signal strength control step of controlling decreased signal strengths of low-frequency components of the image data upon reducing the correlations;
   a broad-band noise conversion step of converting the low-frequency components of decreased signal strength into broad-band noise components; and
   a band width control step of controlling a band width of the broad-band noise conversion step.

5. A non-transitory computer program for visually reducing noise components contained in a low-frequency range of image data, said program making a computer execute:

a correlation reduction step of reducing correlations between a predetermined pixel and surrounding pixels of the predetermined pixel in the image data;

a signal strength control step of controlling decreased signal strengths of low-frequency components of the image data upon reducing the correlations; and a white noise conversion step of converting the low-frequency components of decreased signal strength into white noise components.

6. A non-transitory computer program for visually reducing noise components contained in a low-frequency range of image data, said program making a computer execute:

a correlation reduction step of reducing correlations between a predetermined pixel and surrounding pixels of the predetermined pixel in the image data;

a signal strength control step of controlling decreased signal strengths of low-frequency components of the image data upon reducing the correlations;

a broad-band noise conversion step of converting the low-frequency components of decreased signal strength into broad-band noise components; and a band width control step of controlling a band width of the broad-band noise conversion step.

7. A recording medium characterized by storing a computer program of claim 6.

8. An image processing apparatus for visually reducing noise components contained in a low-frequency range of image data, comprising:

a correlation reduction device configured to reduce correlations between a predetermined pixel and surrounding pixels of the predetermined pixel in the image data;

a signal strength control device configured to control decreased signal strengths of low-frequency components of the image data upon reducing the correlations; and a white noise conversion device configured to convert the low-frequency components of decreased signal strength into white noise components.

9. An image processing apparatus for visually reducing noise components contained in a low-frequency range of image data, comprising:

a correlation reduction device configured to reduce correlations between a predetermined pixel and surrounding pixels of the predetermined pixel in the image data;

a signal strength control device configured to control decreased signal strengths of low-frequency components of the image data upon reducing the correlations;

a broad-band noise conversion device configured to convert the low-frequency components of decreased signal strength into broad-band noise components; and a band width control device configured to control a band width of said broad-band noise conversion means.

* * * * *